(12) United States Patent
Toma et al.

(10) Patent No.: US 7,792,415 B2
(45) Date of Patent: Sep. 7, 2010

(54) PICTURE CODING APPARATUS AND PICTURE DECODING APPARATUS

(75) Inventors: Tadamasa Toma, Toyonaka (JP);
Shinya Kadono, Nishinomiya (JP);
Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/575,654

(22) Filed: Oct. 8, 2009

(65) Prior Publication Data

US 2010/0021143 A1    Jan. 28, 2010

Related U.S. Application Data

(63) Continuation of application No. 10/581,910, filed as application No. PCT/JP2005/010441 on Jun. 1, 2005, now Pat. No. 7,706,662.

(30) Foreign Application Priority Data

Jun. 2, 2004    (JP)    ............... 2004-165006

(51) Int. Cl.
*H04N 5/91* (2006.01)
*H04N 7/00* (2006.01)
*H04N 5/00* (2006.01)
*H04N 7/26* (2006.01)

(52) U.S. Cl. .............. 386/68; 386/46; 386/69; 386/70; 386/124; 386/125; 386/126

(58) Field of Classification Search ............... 386/1, 386/46, 52–55, 65, 67, 82, 109, 124–126; 375/240.01–240.29
See application file for complete search history.

(56) References Cited

U.S. PATENT DOCUMENTS 6,308,003 B1    10/2001 Hirabayashi et al.

2002/0018643 A1 *    2/2002 Okada et al. ............... 386/95

(Continued)

FOREIGN PATENT DOCUMENTS

EP        1 223 754        7/2002

(Continued)

OTHER PUBLICATIONS

International Search Report issued Sep. 30, 2005 in International (PCT) Application No. PCT/JP2005/010441.

(Continued)

*Primary Examiner*—Marsha D Banks Harold
*Assistant Examiner*—Marc Dazenski
(74) *Attorney, Agent, or Firm*—Wenderoth, Lind & Ponack, L.L.P.

(57) ABSTRACT

A picture coding apparatus which generates a stream so as to be able to decode a picture by obtaining a picture parameter set necessary for decoding the picture even at the time of trick-play, the apparatus including: a slice coding unit which codes the picture and generates coded data; a picture parameter set (PPS) generation unit which generates sequence parameter set (SPS); a PPS generation unit which generates the PPS; and an access unit (AU) determination unit which stores pieces of coded data respectively into access units of a random access unit (RAU) and stores the SPS into a first AU, and stores the PPS into the first AU or into the AU in which one piece of the coded data that refers to the PPS is stored.

6 Claims, 27 Drawing Sheets

U.S. PATENT DOCUMENTS

| | | |
|---|---|---|
| 2002/0146239 A1 | 10/2002 | Hamasaka et al. |
| 2004/0008790 A1 | 1/2004 | Rodriguez |
| 2005/0147375 A1 | 7/2005 | Kadono |

FOREIGN PATENT DOCUMENTS

| | | |
|---|---|---|
| JP | 5-30454 | 2/1993 |
| JP | 2002-10213 | 1/2002 |
| JP | 2002-176622 | 6/2002 |
| JP | 2003-018549 | 1/2003 |
| JP | 2004-242286 | 8/2004 |
| WO | 2004/066635 | 8/2004 |

OTHER PUBLICATIONS

PCT Written Opinion of the International Searching Authority issued Sep. 30, 2005 in International (PCT) Application No. PCT/JP2005/010441.

Office Action dated Apr. 24, 2009 in U.S. Appl. No. 10/581,910.

Office Action dated Sep. 21, 2009 in U.S. Appl. No. 10/581,910.

* cited by examiner

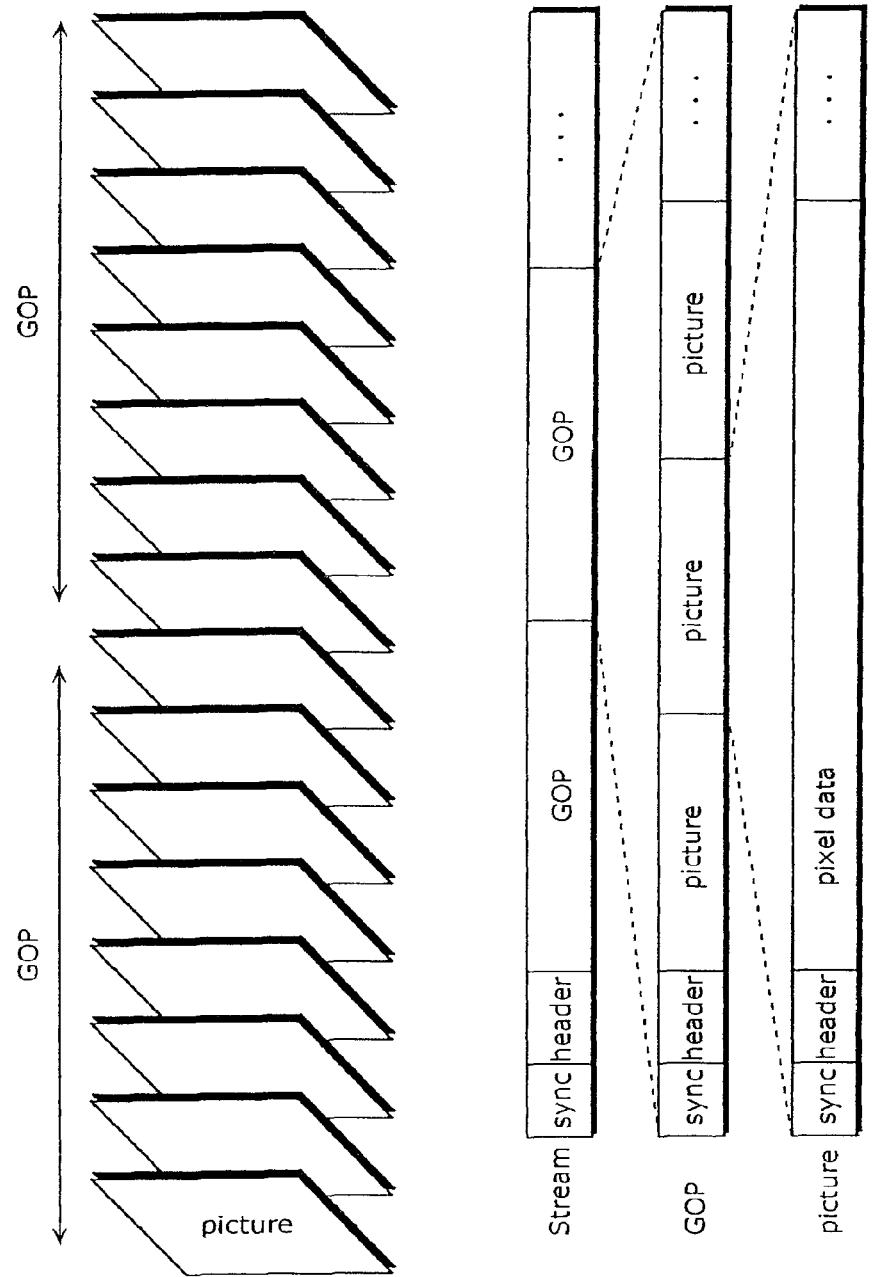

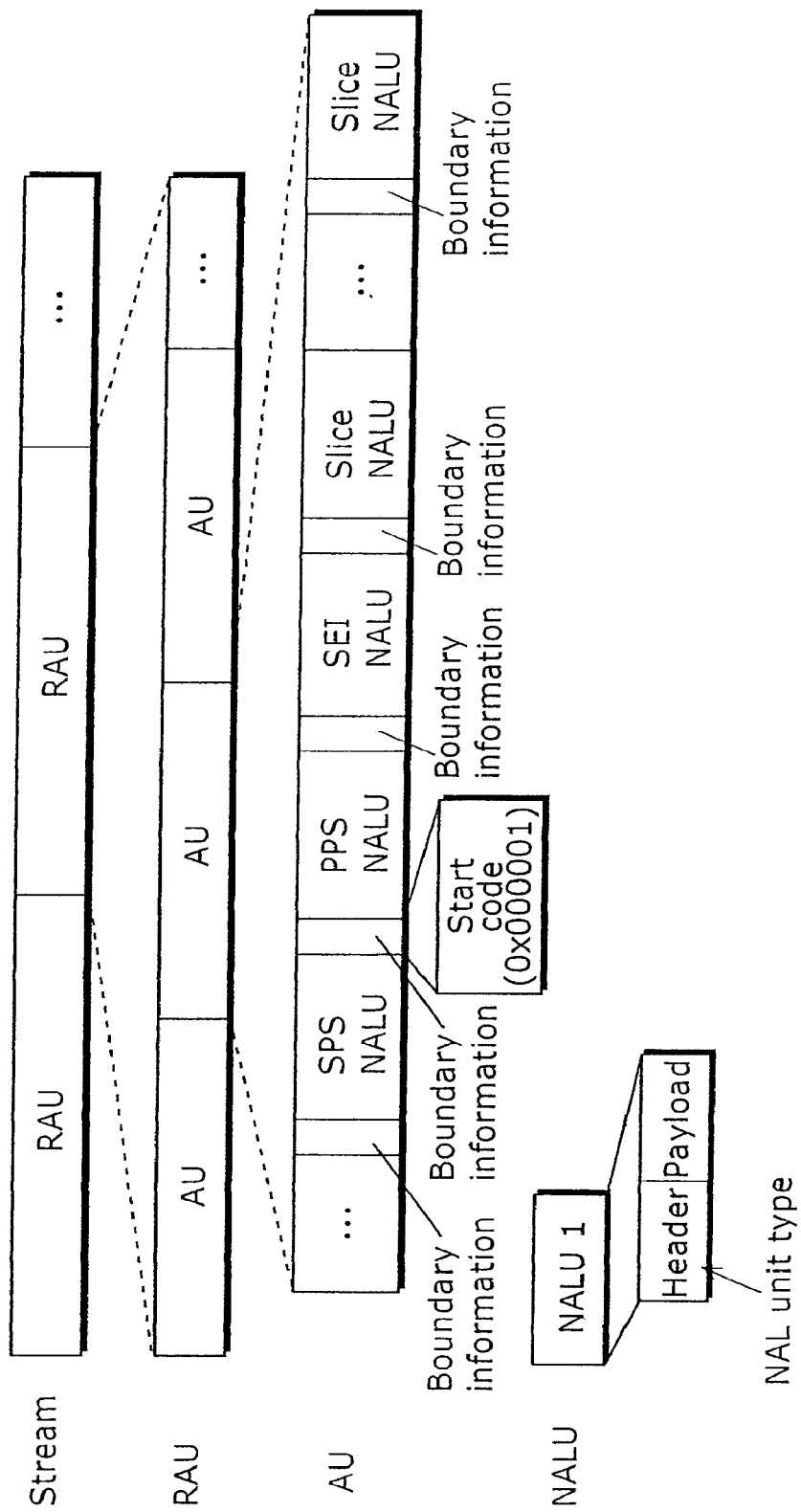

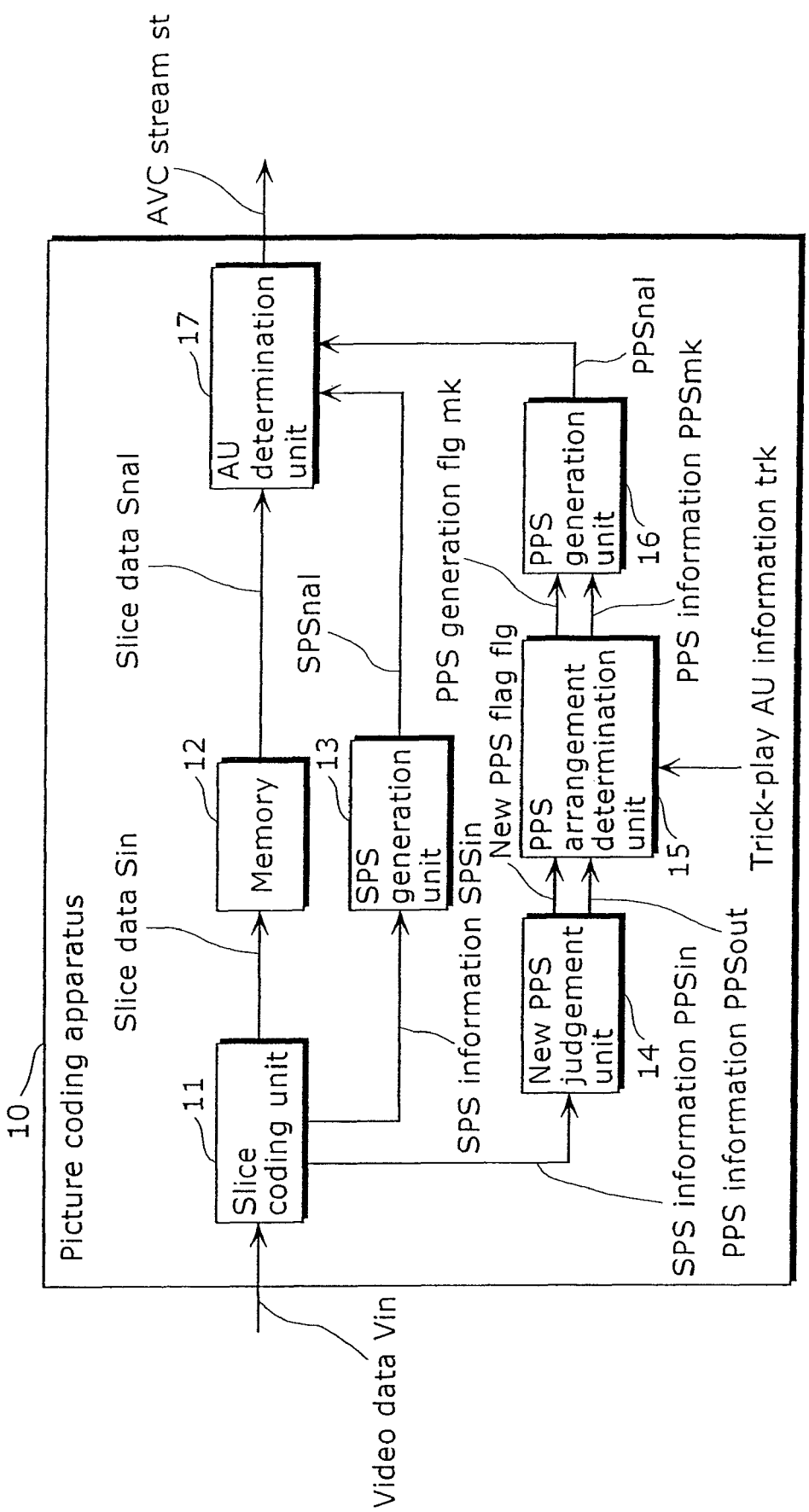

PICTURE CODING APPARATUS AND PICTURE DECODING APPARATUS

This application is a continuation of U.S. application Ser. No. 10/581,910, filed Jun. 7, 2006, now U.S. Pat. No. 7,706,662 which is a national stage application of International Application No. PCT/JP2005/010441, filed Jun. 1, 2005, the contents of which is fully incorporated herein by reference.

BACKGROUND OF THE INVENTION

1. Technical Field

The present invention relates to a picture coding apparatus which codes a moving picture on a picture-by-picture basis and to a picture decoding apparatus which decodes the coded moving picture coded by the picture coding apparatus, in particular to a picture coding apparatus and picture decoding apparatus corresponding to a trick-play such as high-speed playback (variable-speed playback).

2. Background Art

In the age of multimedia which integrally handles audio, video and other pixel values, existing information media, specifically, newspaper, magazine, television, radio, telephone and the like through which information is conveyed to people, have recently come to be included in the scope of multimedia. Generally, multimedia refers to something that is represented by associating not only characters, but also graphics, sound, and especially images and the like, together, but in order to include the aforementioned existing information media in the scope of multimedia, it becomes a prerequisite to represent such information in a digital form.

However, if the amount of information carried by each of the mentioned information media is estimated as the amount of digital information, while the amount of information for 1 character in the case of text is 1 to 2 bytes, the amount of information required for sound is 64 Kbits per second (telephone quality), and 100 Mbits or over per second becomes necessary for moving pictures (current television receiving quality), it is not realistic for the information media to handle such an enormous amount of information as it is in digital form. For example, although video phones are already in the actual use via Integrated Services Digital Network (ISDN) which offers a transmission speed of 64 Kbit/s to 1.5 Mbit/s, it is impossible to transmit images on televisions and images taken by cameras directly through ISDN.

Accordingly, information compression techniques have become required, and for example, in the case of the video phone, the H.261 and H.263 standards for moving picture compression technology, internationally standardized by the International Telecommunication Union—Telecommunication Standardization Sector (ITU-T), are being employed. Moreover, with MPEG-1 standard information compression techniques, it has also become possible to store video information onto general music compact discs (CD) together with audio information.

Here, Moving Picture Experts Group (MPEG) is an international standard for moving picture signal compression standardized by International Organization for Standardization and International Electrotechnical Commission (ISO/IEC). The MPEG-1 is a standard for compressing moving picture signals up to 1.5 Mbps, in other words, compressing television signals up to approximately a hundredth part. Moreover, since target picture quality within the scope of the MPEG-1 standard is limited to a medium degree of quality which can be realized by a transmission speed of primarily about 1.5 Mbps, the use of MPEG-2, which was standardized to satisfy demands for further improved picture quality, realizes television broadcasting quality with moving picture signals compressed to 2 to 15 Mbps. Furthermore, currently, MPEG-4, which has exceeded MPEG-1 and MPEG-2 compression ratios, and also enables coding, decoding and operating on a per-object base, and realizes the new functions required for the multimedia age, has been standardized by the work group (ISO/IEC JTC1/SC29/WG11) that has promoted the standardization of MPEG-1 and MPEG-2. The MPEG-4 was initially aimed at standardizing a low bit rate coding method. However, currently, this has been expanded to the standardization of a more versatile coding method further including high bit rate coding for interlaced pictures. After that, MPEG-4 Advanced Video Coding (AVC) is standardized as a next generation picture coding method with higher compression ratio by a cooperation of ISO/IEC and ITU-T. It is prospected to be used for next generation optical disc related devices or for a broadcast directed to cell phone terminals.

Generally, in coding of a moving picture, the amount of information is compressed by reducing redundancy in temporal and spatial directions. Accordingly, in an inter-picture prediction coding which aims at reducing the temporal redundancy, a motion estimation and a generation of a predictive picture are performed on a block-by-block basis by referring to a preceding or following picture, and a difference value between the obtained predictive picture and a picture to be coded is coded. Here, a picture indicates a screen: it indicates a frame in a progressive picture; and it indicates a frame or a field in an interlaced picture. Here, the interlaced picture is a picture whose frame is made up of two fields which differ temporally each other. In a coding and decoding of the interlaced picture, it is allowed to process one frame as a frame, to process it as two fields, or to process it as a frame structure or as a field structure on a block-by-block basis in the frame.

An I picture is a picture that is inter-picture prediction coded without referring to a reference picture. Also, a P picture is a picture that is inter-picture prediction coded by only referring to one picture. Further, a B picture is a picture that can be inter-picture prediction coded by referring to two pictures at the same time. The B picture can refer to two pictures as a pair of any pictures which are displayed before or after the B picture. A reference picture can be specified for each block which is a basic unit for coding and decoding. The reference picture which is precedently described in a coded bit stream is distinguished as a first reference picture with the reference picture which is subsequently described as a second reference picture. Note that, as a condition for coding and decoding these pictures, it is necessary that a picture to be referenced has already been coded and decoded.

FIG. 1 is a drawing showing a structure of a stream of the conventional MPEG-2. As shown in FIG. 1, the stream of the MPEG-2 has a hierarchical structure as described in the following. The stream is made up of more than one Groups of Pictures (GOP), and an editing and random accessing of a moving picture are allowed by using the stream as a basic unit for coding. Each GOP is made up of more than one picture. Each picture is one of an I picture, a P picture or a B picture. Each stream, GOP and picture is further made up of synchronous code (sync) which indicates a breakpoint of each unit and a header which is common data in the unit.

FIG. 2A and FIG. 2B are drawings showing an example of a predictive structure among pictures used in MPEG-2.

In the drawings, pictures shown as diagonally shaded area are pictures to be referenced by other pictures. As shown in FIG. 2A, in MPEG-2, P picture (P0, P6, P9, P12, P15) can be prediction coded by referring to an I picture or P picture that is displayed immediately before said P picture. Further, B picture (B1, B2, B4, B5, B7, B8, B10, B11, B13, B14, B16, B17, B19, B20) can be prediction coded by referring to an I picture or P picture that is displayed prior to and following to said B picture Furthermore, arranging order in a stream has been determined as follows: the I pictures and P pictures are arranged in displaying order; and each of the B pictures is arranged immediately after an I picture or P picture that is displayed immediately after said B picture. As a GOP structure, for example, as shown in FIG. 2B, pictures from I3 to B14 can be included in one GOP.

FIG. 3 is a drawing showing a structure of a stream of MPEG-4 AVC. In MPEG-4 AVC, there is no concept equivalent to the GOP. However, by separating data into special picture units by which each picture is decoded without depending on other pictures, it is possible to construct a unit which can be randomly accessed and is equivalent to the GOP. Such separated units are called random access units (RAU).

Next, it is explained about the access unit (hereafter referred to as AU) which is a basic unit for dealing with a stream. An AU is a unit used for storing coded data in one picture, including parameter sets (PS) and slice data. The parameter sets (PS) are divided into a picture parameter set (hereafter simply referred to as PPS) which is data corresponding to a header of each picture and a sequence parameter set (hereafter simply referred to as SPS) which is corresponding to a header of a unit of GOP in MPEG-2 and higher. Note that the PPS and SPS are initialization information necessary for initializing respective decoding.

The SPS includes a profile, a maximum number of pictures available for reference and a picture size and so on as common reference information for decoding all coded pictures in the random access unit (RAU). The PPS includes, for each coded picture in the random access unit (RAU), a type of a variable length coding method, an initial value of quantization step and a number of reference pictures and so on as reference information for decoding the picture. Further, the SPS and PPS can include a quantization matrix so that the PPS can be overwritten with the quantization matrix set in the SPS if necessary. An identifier for identifying which one of the PPS and SPS to refer is added to each picture. Also, slice data includes a frame number FN which is an identification number for identifying a picture. Here, the PPS to be referenced by each picture can be updated on a picture-by-picture basis, while the SPS can be updated only in the IDR picture that is explained later.

For the I pictures of MPEG-4 AVC, there are two types of the I pictures: an Instantaneous Decoder Refresh (IDR) picture; and an I picture which is not the IDR picture. The IDR picture is an I picture which can be decoded without referring to a picture preceding to the IDR picture in decoding order, and is equivalent to a leading I picture of a closed GOP of MPEG-2. For the I picture which is not the IDR picture, a picture which follows said I picture in decoding order may refer to a picture which is preceding to said I picture in decoding order. A structure such as an open GOP of MPEG-2 can be constructed by positioning the I picture that is not an IDR picture in a first access unit of the random access unit RAU and restricting a predictive structure of pictures in the random access unit RAU.

The AU of MPEG-4 AVC can include, in addition to data necessary for decoding a picture, supplemental information called Supplemental Enhancement Information (SEI) which is unnecessary for decoding a picture, boundary information of AU and the like. The data such as parameter set, slice data and SEI are all stored in a Network Abstraction Layer (NAL) unit (NALU). The NAL unit is made up of a header and a payload, and the header includes a field which indicates a type of data stored in the payload (hereafter referred to as NAL unit type). The value of the NAL unit type is defined for each type of data such as a slice and SEI. By referring to the NAL unit type, the type of data stored in the NAL unit can be specified.

The NAL unit of SEI can store one or more SEI messages. The SEI message is also made up of a header and a payload and a type of information stored in the payload is identified by a type of SEI message indicated in the header.

The first AU located at a head of the random access unit RAU includes a NAL unit of the SPS referenced by all AUs of the random access unit RAU and a NAL unit of the PPS referenced by the first AU. Further, the NAL unit of the PPS necessary for decoding each AU of the random access unit RAU is guaranteed to include an AU prior to the current AU, in decoding order, in the current AU or in the random access unit RAU.

Here, there is no information for identifying a NAL unit boundary in a NAL unit so that boundary information can be added to a header of each NAL unit. When a stream of MPEG-4 AVC is used in a MPEG-2 Transport Stream (TS) and a Program Stream (PS), a start code prefix indicated in 3 bytes of 0x000001 is added to the header of the NAL unit. Further, in the MPEG-2 TS and PS, it is determined that a NAL unit called Access Unit Delimiter should be inserted into the header of the AU, which shows an AU boundary.

Various conventional techniques relating to such video coding and decoding have been proposed (e.g. refer to Japanese Laid-Open Patent Publication No. 2003-18549). FIG. 4 is a block diagram showing a picture coding apparatus which realizes a conventional picture coding method.

A picture coding apparatus 191 compresses and codes inputted video picture data Vin, and outputs an AVC stream st that is a coded stream of the MPEG-4 AVC. It includes a slice coding unit 11, a memory 12, an SPS generation unit 13, a new PPS judgement unit 14, a PPS generation unit 16 and an AU determination unit 17.

The video data Vin is inputted to the slice coding unit 11. The slice coding unit 11 codes slice data for one AU, stores slice data Sin that is the result of coding into the memory 12, and outputs SPS information SPSin necessary for decoding the picture to the SPS generation unit 13, while outputting PPS information PPSin necessary for decoding the AU to the new PPS judgement unit 14.

The SPS generation unit 13 generates a SPS based on the SPS information SPSin, and outputs SPSnal including the SPS to the AU determination unit 17.

The new PPS judgement unit 14 holds the PPS information PPSin for each AU in an order starting from the first AU in the random access unit RAU, compares the inputted PPS information PPSin with the held PPS information PPSin. When the inputted PPS information PPSin is new, a new PPS flag flg which indicates that the inputted PPS information PPSin is new to 1, and outputs the PPS information PPSin to the PPS generation unit 16 as PPS information PPSout. On the other hand, when the inputted PPS information PPSin is included in the held PPS information PPSin, the new PPS judgement unit 14 sets the new PPS flag to 0.

The PPS generation unit 16 generates a PPS based on the inputted PPS information PPSout when the new PPS flag is 1, and outputs the data PPSnal including the PPS to the AU determination unit 17.

The AU determination unit 17 generates NAL units of the SPS and PPS respectively based on the data SPSnal and data PPSnal, and generates a NAL unit of slice data by obtaining the slice data Snal from the memory 12. The AU determination unit 17 then determines AU data by arranging the generated NAL units in a predetermined order, constructs an AVC stream st, and outputs the AVC stream st.

FIG. 5 is a flowchart showing an operation of the picture coding apparatus 191. In step S101, the picture coding apparatus 101 codes slice data for one picture, and generates a SPS in step S102. Here, the generation of the SPS may be performed only in the first AU of the random access unit RAU. Following that, the picture coding apparatus 191 judges whether or not the PPS information (PPS) of the AU is new in the random access unit RAU in the step S103. If the PPS information is new (Yes in step S111), the picture coding apparatus 191 determines to store the PPS into an AU, and the operation moves on to step S106 from step S111. If the PPS information is not new (No in step S111), the operation moves on to step S107. In step S106, the picture coding apparatus 191 generates the PPS. In step S107, when it is judged that the PPS information is new and the PPS is stored into the AU in step S111, the picture coding apparatus 191 includes the PPS generated in step S106 in the AU, generates data for one AU, and outputs the generated data.

FIG. 6 is a block diagram showing a picture decoding apparatus which realizes a conventional picture decoding method.

The picture decoding apparatus 291 separates and decodes an AU from the inputted AVC stream st, and outputs decoded data Dout which is a decoded picture. It includes an AU boundary detection unit 22, a PPS obtainment unit 23, a PPS memory 24, a decoding information obtainment unit 25 and a decoding unit 26.

The AU boundary detection unit 22 detects a boundary of an AU and separates the AU data. When a NAL unit of the PPS is included in the AU data, it outputs the NAL unit of the PPS PPSnal to the PPS obtainment unit 23, and outputs other NAL units Dnal to the decoding information obtainment unit 25.

The PPS obtainment unit 23 analyzes a NAL unit PPSnal, and let the PPS memory 24 hold the analysis result as analysis result signal PPSst. The decoding information obtainment unit 25 analyzes the NAL unit Dnal, and obtains SPS, slice data and the like, while obtaining data PPSref including the PPS referenced by the AU from the PPS memory 24, and outputs the slice data and the SPS and PPS necessary for decoding the slice data to the decoding unit 26 as pre-decoded data Din.

The decoding unit 26 decodes the slice data based on the pre-decoded data Din, and outputs the decoded data Dout.

By the way, the random access unit RAU is a data structure which indicates that decoding can be performed from the first AU, and necessary for realizing trick-play such as jump-in playback, variable-speed playback and reverse playback or for realizing skip playback on a random access unit-by-unit basis in a storing device having an optical disc and a hard disc.

However, in a random access unit RAU in a stream of the conventional MPEG-4 AVC, a PPS necessary for decoding an AU had not been able to be obtained in the case where high-speed playback is performed by selecting, decoding and displaying a specific AU such as an AU of an I picture or a P picture.

FIG. 7A and FIG. 7B show a structural example of a random access unit RAU.

As shown in FIG. 7A, the random access unit RAU is made up of fifteen AUs from AU 1 to AU 15. At the time of high-speed playback, five AUs of AU1, AU4, AU7, AU10 and AU13 are decoded and displayed. Here, the AU1 to AU8 refer to PPS#1 as a PPS, and the AU9 to AU15 refer to PPS#2. The PPS#1 and PPS#2 are respectively stored in AU1 and AU9. Herein, as shown in FIG. 7B, the AU to be decoded at the time of high-speed playback does not include AU9 and the PPS#2 cannot be obtained at the time of high-speed playback so that AU10 and AU13 cannot be decoded.

Thus, when an AU in the random access unit RAU is selectively decoded and displayed, the necessary PPS cannot be obtained if only predetermined AU is decoded as in MPEG-2. Therefore, there is a problem that all AUs in the random access unit RAU need to be analyzed in order to obtain the PPS.

In order to solve the problem, an object of the present invention is to provide a picture coding apparatus which generates a stream so as to decode a picture by obtaining an appropriate picture parameter set necessary for the decoding, and a picture decoding apparatus which decodes the generated stream.

SUMMARY OF THE INVENTION

In order to achieve the above objective, a picture coding apparatus according to the present invention is a picture coding apparatus which codes pictures on a picture-by-picture basis, and generates a random access unit as a part of a stream, the random access unit including the coded pictures, said apparatus comprising: a coding unit operable to generate pieces of coded picture data by coding the pictures on a picture-by-picture basis; a first information generation unit operable to generate sequence parameter set information that is a parameter group to be referenced for decoding all the pieces of the coded picture data; a second information generation unit operable to generate pieces of picture parameter set information, each of which is a parameter group to be referenced for decoding each piece of the coded picture data; a first storage unit operable to store the pieces of the coded picture data respectively into access units that constitute the random access unit; a second storage unit operable to store the sequence parameter set information into a first access unit that is located at a head of the random access unit; and a third storage unit operable to store each piece of the picture parameter set information into the first access unit of the random access unit or into an access unit in which a piece of the coded picture data that refers to the piece of the picture parameter set information is stored. For example, said third storage unit i) stores the pieces of the picture parameter set information into the first access unit, and in the case where a piece of the picture parameter set information that is identical to one of the pieces of the picture parameter set information generated by the second information generation unit is not stored in the first access unit, ii) stores the piece of the picture parameter set information into the access unit in which the piece of the coded picture data that refers to the piece of the picture parameter set information is stored.

Accordingly, in the random access unit generated as a part of a stream, picture parameter set information (PPS) necessary for decoding each piece of the coded picture data is stored in a first access unit (AU) of the random access unit or in an access unit in which the piece of the coded picture data is stored. Therefore, even in the case where trick-play is performed as at least a piece of the coded picture data stored in the first access unit out of the all pieces of the coded picture data in the random access unit is selected and played back, a piece of the picture parameter set information necessary for decoding the selected piece of the picture can be obtained appropriately and promptly without failing to do so. As the result, the trick-play can be smoothly performed.

Further, a picture decoding apparatus according to the present invention is a picture decoding apparatus which obtains, from a stream, a random access unit including coded pictures, each of which is stored in a respective access unit as a piece of coded picture data, and decodes the pieces of the coded picture data on a picture-by-picture basis, said apparatus comprising: a picture specification unit operable to specify a part of the pieces of the coded picture data to be decoded from the pieces of the coded picture data so as to specify a piece of the coded picture data stored in a first access unit that is located at a head of the random access unit; a first obtainment unit operable to obtain, from the first access unit, sequence parameter set information that is a parameter group referenced for decoding all the pieces of the coded picture data; a second obtainment unit operable to obtain picture parameter set information that is a parameter group referenced for decoding a piece of the coded picture data to be decoded, from the first access unit or an access unit in which the piece of the coded picture data to be decoded is stored; and a decoding unit operable to decode the piece of the coded picture data to be decoded by referring to the sequence parameter set information and the picture parameter set information.

For example, the picture parameter set information (PPS) necessary for decoding each piece of the coded picture data is stored in a first access unit (AU) of the random access unit or in an access unit in which the coded picture data referring to the piece of the picture parameter set information is stored. Accordingly, even in the case where the trick-play is performed as a part of the pieces of the coded picture data in the random access unit is decoded and played back, a piece of the picture parameter set information of a piece of the coded picture data to be decoded, that is at least a piece of the coded picture data stored in the first access unit, is obtained from the first access unit or from the access unit in which the piece of the coded picture data to be decoded is stored. Therefore, the piece of the picture parameter set information necessary for decoding the piece of the coded picture data can be appropriately and promptly obtained without failing to do so. As the result, the trick-play can be smoothly performed.

Furthermore, in order to achieve the above objective, the picture coding method according to the present invention is a picture coding method for coding moving pictures on a picture-by-picture basis, said method comprising: generating pixel coded data by coding pixels of a picture so that a random access unit having one or more pictures includes a picture to be decoded at the time of trick-play such as high-speed playback and a reverse playback and a picture to be decoded only at the time of normal playback that all pictures are decoded and displayed; generating pixel coded data by coding the pixels of the picture; generating sequence initialization information that is valid for all pictures that constitutes the random access unit out of the initialization information referenced when the picture is decoded; generating picture initialization information that can be set for each picture in the random access unit out of the initialization information referenced when the picture is decoded; storing the coded data of the generated pixel, the sequence information or the picture initialization information respectively into different sub-picture units; and generating a picture access unit which inevitably includes the sub-picture unit of the generated coded data and selectively includes the sub-picture unit of the sequence initialization information or the picture initialization information, wherein in said generating of the picture access unit, stores the sub-picture unit of the picture initialization information so that the picture initialization information of the picture to be decoded at the time of trick-play can be obtained from the picture access unit in which a picture preceding to the same picture access unit or the random access unit in decoding order and decoded at the time of the trick-play.

Further, the picture to be decoded at the time of the trick-play may be a picture coded by an intra picture prediction or a uni-prediction.

Further, the picture to be decoded at the time of the trick-play may be a picture that is not referenced by other pictures, out of the picture coded by the intra prediction and the uni-prediction or the picture coded by a bi-prediction.

Furthermore, in said generating of the picture access unit, for all pictures to be decoded at the time of trick-play, the sub-picture unit including the picture initialization information referenced for decoding a picture may be stored in a picture access unit.

In addition, a first picture access unit in the random access unit may include the sub-picture unit in which the sequence initialization information is stored, the sequence initialization information being referenced when the all pictures in the random access unit are decoded.

Further, in order to achieve the above objective, a picture decoding method according to the present invention is a picture decoding method for decoding the coded data coded by the picture coding method, said decoding method comprising: determining a picture to be decoded; obtaining the sequence initialization information and the picture initialization information from a picture access unit of the determined picture; and decoding the coded data stored in the sub-picture access unit by referring the obtained sequence initialization information and the picture initialization information, wherein said determining including determining to all pictures at the time of normal playback, and selecting a picture necessary to be decoded at the time of trick-play.

Furthermore, in order to achieve the above objective, a multiplexing method according to the present invention is a multiplexing method for multiplexing a coded stream and management information of the coded stream and recording the multiplexed result, said multiplexing method comprising: coding a moving picture and generating a coded stream; packetizing the coded stream; generating access information necessary for separating picture data from the packet coded stream; multiplexing management information including the access information with the packet coded stream; and recording the multiplexed data, wherein in said coding, the coded stream is generated by the above-mentioned picture coding method.

Further, in order to achieve the above objective, a program according to the present invention is a program for causing a computer to execute the picture coding method, said program comprising: coding moving pictures on a picture-by-picture basis, said method comprising: generating pixel coded data by coding a pixels of a picture so that a random access unit having one or more pictures includes a picture to be decoded at the time of trick-play such as high-speed playback and a reverse playback and a picture to be decoded only at the time of normal playback that all pictures are decoded and displayed; generating pixel coded data by coding the pixels of the picture; generating sequence initialization information that is valid for all pictures that constitutes the random access unit out of the initialization information referenced when the picture is decoded; generating picture initialization information that can be set for each picture in the random access unit out of the initialization information referenced when the picture is decoded; storing the coded data of the generated pixel, the sequence information or the picture initialization information respectively into different sub-picture units; and generating a picture access unit which inevitably includes the sub-picture unit of the generated coded data and selectively includes the sub-picture unit of the sequence initialization information or the picture initialization information, wherein in said generating of the picture access unit, stores the sub-picture unit of the picture initialization information so that the picture initialization information of the picture to be decoded at the time of trick-play can be obtained from the picture access unit in which a picture preceding to the same picture access unit or the random access unit in decoding order and decoded at the time of the trick-play.

Further, in order to achieve the above objective, a program according to the present invention is a program for executing a computer to perform the picture decoding method, said program causing a computer to decode the coded data coded by the picture coding method, said program comprising: determining a picture to be decoded; obtaining the sequence initialization information and the picture initialization information from a picture access unit of the determined picture; and decoding the coded data stored in the sub-picture access unit by referring to the obtained sequence initialization information and picture initialization information, wherein in said determining including determining to decode all pictures at the time of normal playback and selecting pictures necessary to be decoded when trick-play is performed.

As described in the above, in a random access unit RAU in a stream, an AU to be decoded at the time of variable speed playback is only selected and the AU can be decoded by appropriately obtaining picture parameter set information necessary for decoding the AU. Accordingly, the present invention can easily realize an excellent picture coding apparatus and picture decoding apparatus corresponding to the variable speed playback so that its practical value is high.

It should be noted that the present invention can be realized not only as the picture coding apparatus, the picture decoding apparatus and the programs thereof, but also as a recording medium in which the program is stored, and a stream generated by the picture coding apparatus.

As further information about technical background to this application, the disclosure of Japanese Patent Application No. 2004-165006 filed on Jun. 2, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 1 shows a stream structure of MPEG-2.
FIG. 3 shows a stream structure of MPEG-4 AVC.
FIG. 8 is a block diagram showing a picture coding apparatus according to a first embodiment of the present invention.

DETAILED DESCRIPTION OF THE INVENTION

Hereafter, it is explained about embodiments of the present invention with references to drawings.

First Embodiment

FIG. 8 is a block diagram showing a picture coding apparatus which realizes a picture coding method of the present invention.

Figure 2A:
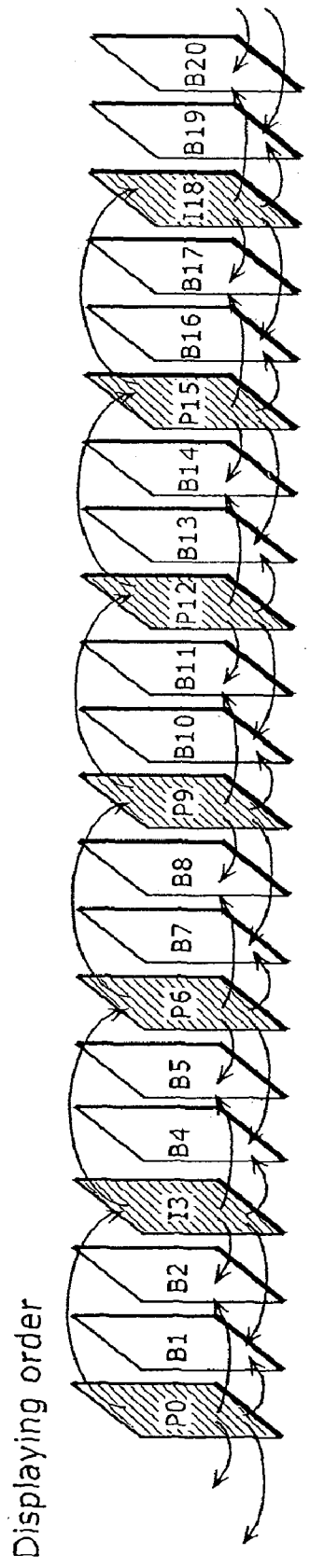
FIG. 2A and FIG. 2B show a GOP structure of MPEG-2.
Figure 2B:
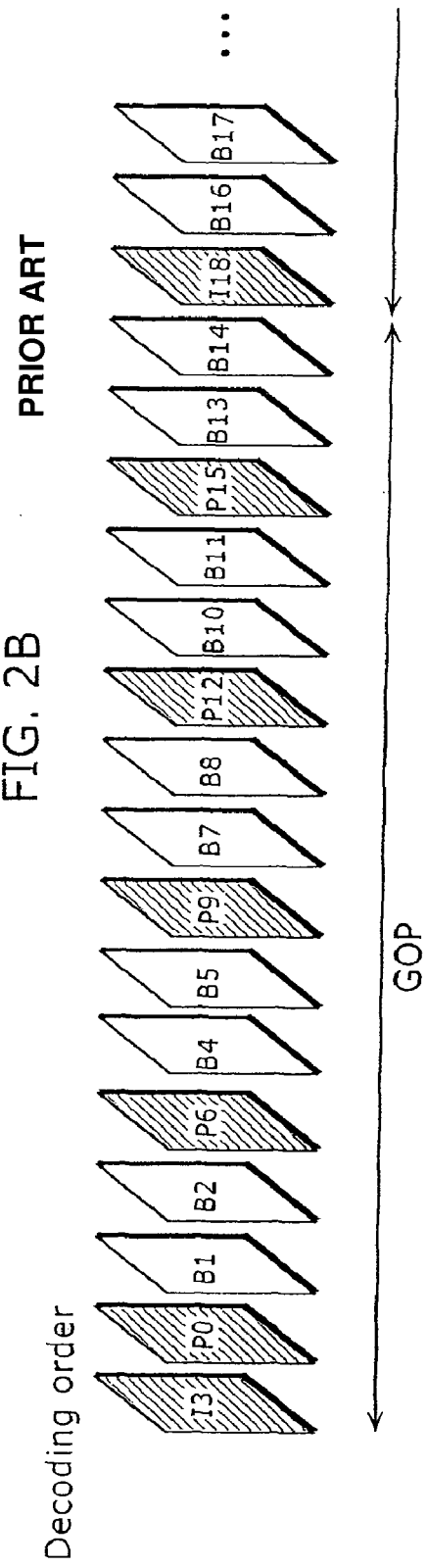
Figure 4:
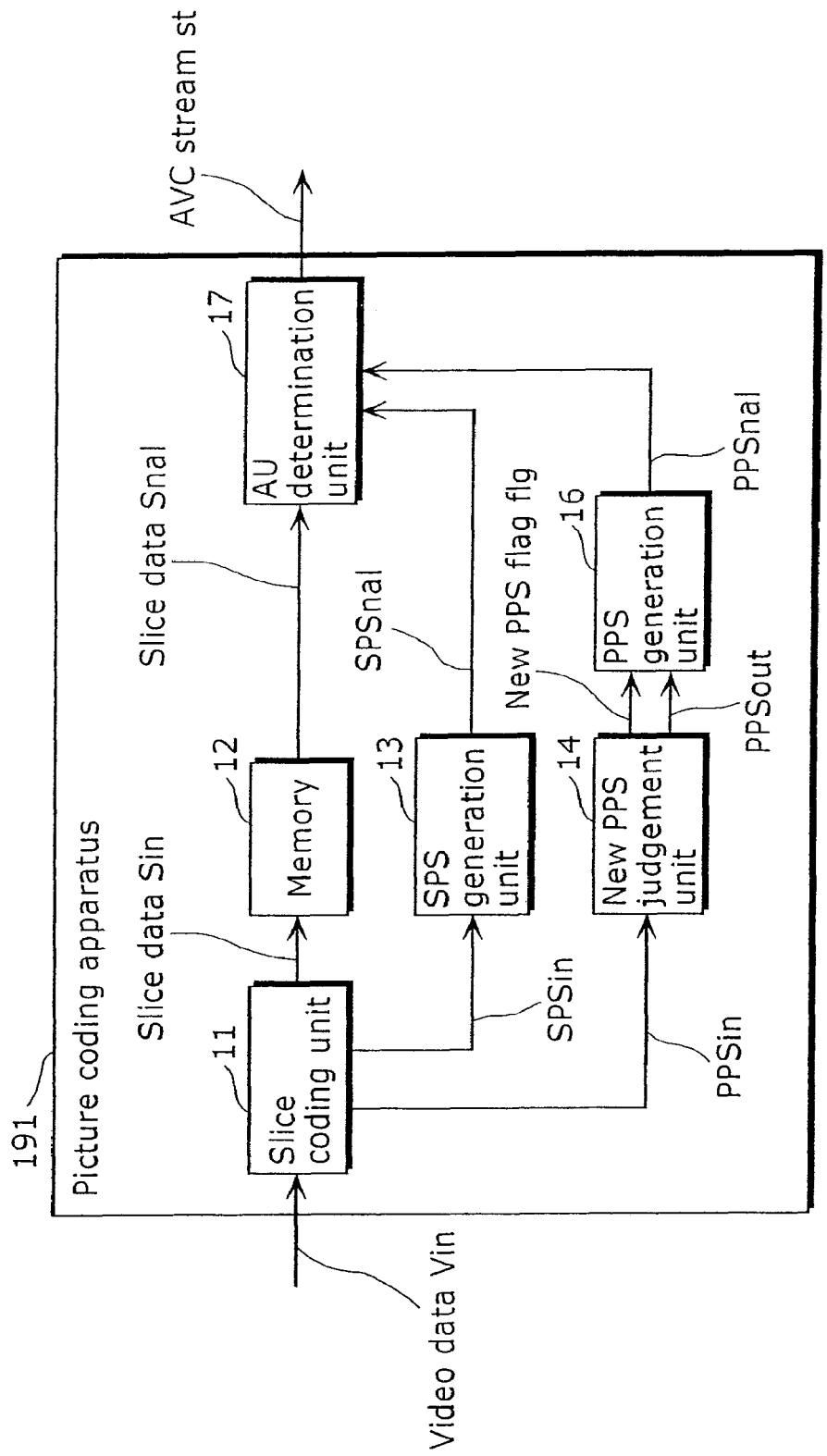
FIG. 4 is a block diagram showing a structure of a conventional picture coding apparatus.

In the diagram, same numbers are assigned to constituents performing same operation as constituents in the picture coding apparatus which realizes the conventional coding method shown in FIG. 4, and the detailed explanations about same constituents are omitted here.

The difference of the present invention with the conventional picture coding apparatus is that NAL units of PPS are arranged so as to be able to obtain a PPS necessary for decoding an AU by selecting the AU to be decoded at the time of trick-play such as various-speed playback and reverse playback. Hereafter, an AU to be decoded at the time of trick-play is called as a trick-play AU. At the time of trick-play, decoding results of all trick-play AUs may be displayed or one or more trick-play AUs may be selected for display.

The trick-play AU indicates, for example, an AU of an I picture and P picture. Here, if setting a restriction such as that the AU of the P picture does not refer to the AU of the B picture, only the trick-play AU can be decoded at the time of trick-play. Further, distinguishing the B picture to be referenced by other AUs from the B picture not to be referenced, the AUs of the B pictures which is referenced by other pictures, I picture, and P picture can be trick-play AUs.

The picture coding apparatus 10 includes a PPS arrangement determination unit 15 in addition to the constituents in the conventional picture coding apparatus. The PPS arrangement determination unit 15 judges whether or not to store the PPS into an AU based on a value of a new PPS flag flg, PPS information PPSout, and trick-play AU information trk indicating whether or not the AU which has been generated is a trick-play AU. The PPS arrangement determination unit 15 sets a PPS generation flag mk to 1 when it is judged that the PPS is to be stored, while it sets the flag to 0 when it is judged that the PPS is not to be stored, and outputs the PPS generation flag mk to a PPS generation unit 16. Here, when the PPS generation flag mk is set to 1, the PPS arrangement determination unit 15 outputs the PPS generation flag mk together with PPS information PPSmk for generating a PPS, to the PPS generation unit 16. The PPS generation unit 16 generates a NAL unit of the PPS based on the PPS information PPSmk when the PPS generation flag mk is set to 1. Here, the trick-play AU information trk is separately obtained from a unit which is not shown in the diagram, or from a slice coding unit 11.

Figure 9:
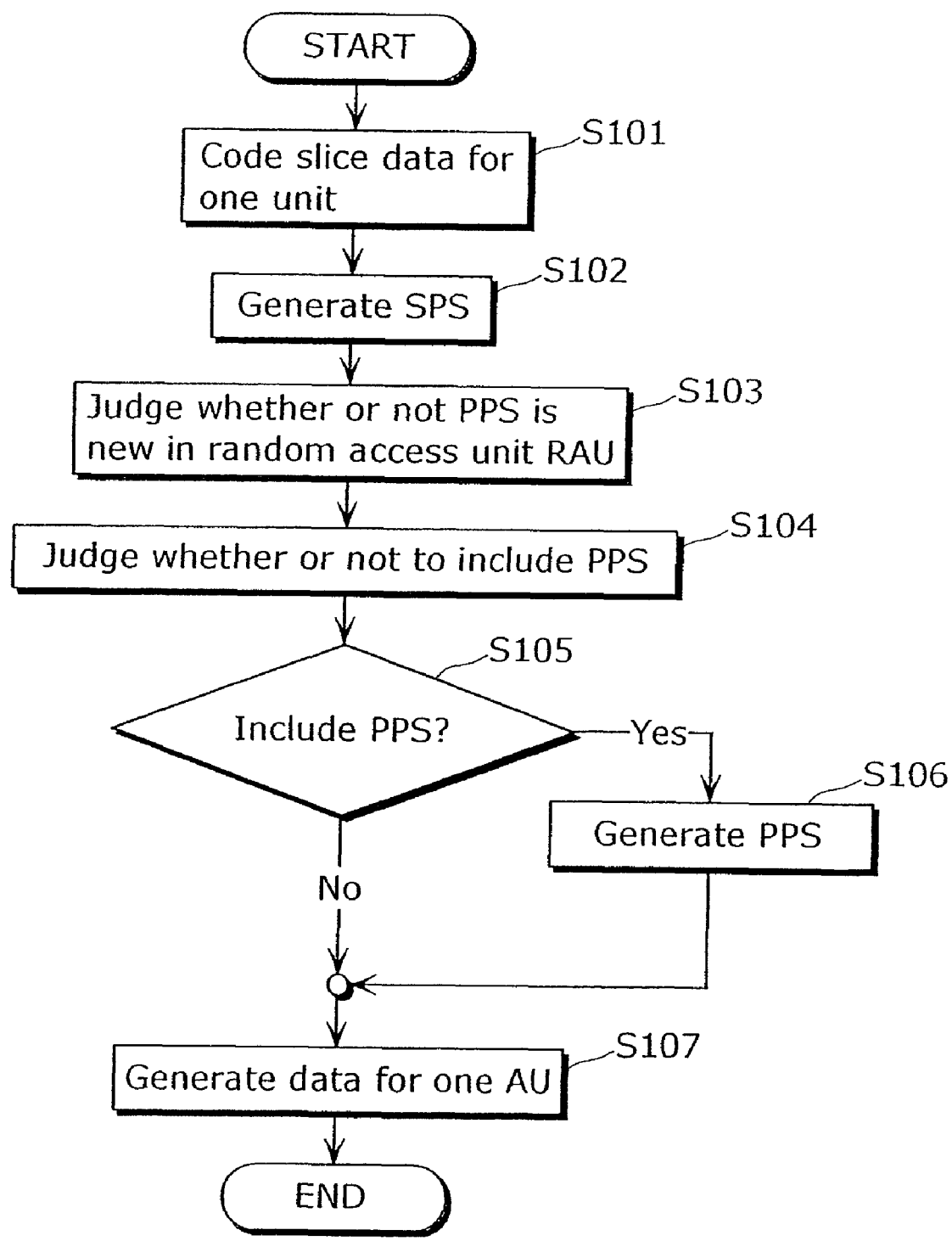
FIG. 9 is a flowchart showing an operation of the picture coding apparatus according to the first embodiment of the present invention.

FIG. 9 is a flowchart showing a procedure of the picture coding method of the present invention.

Figure 5:
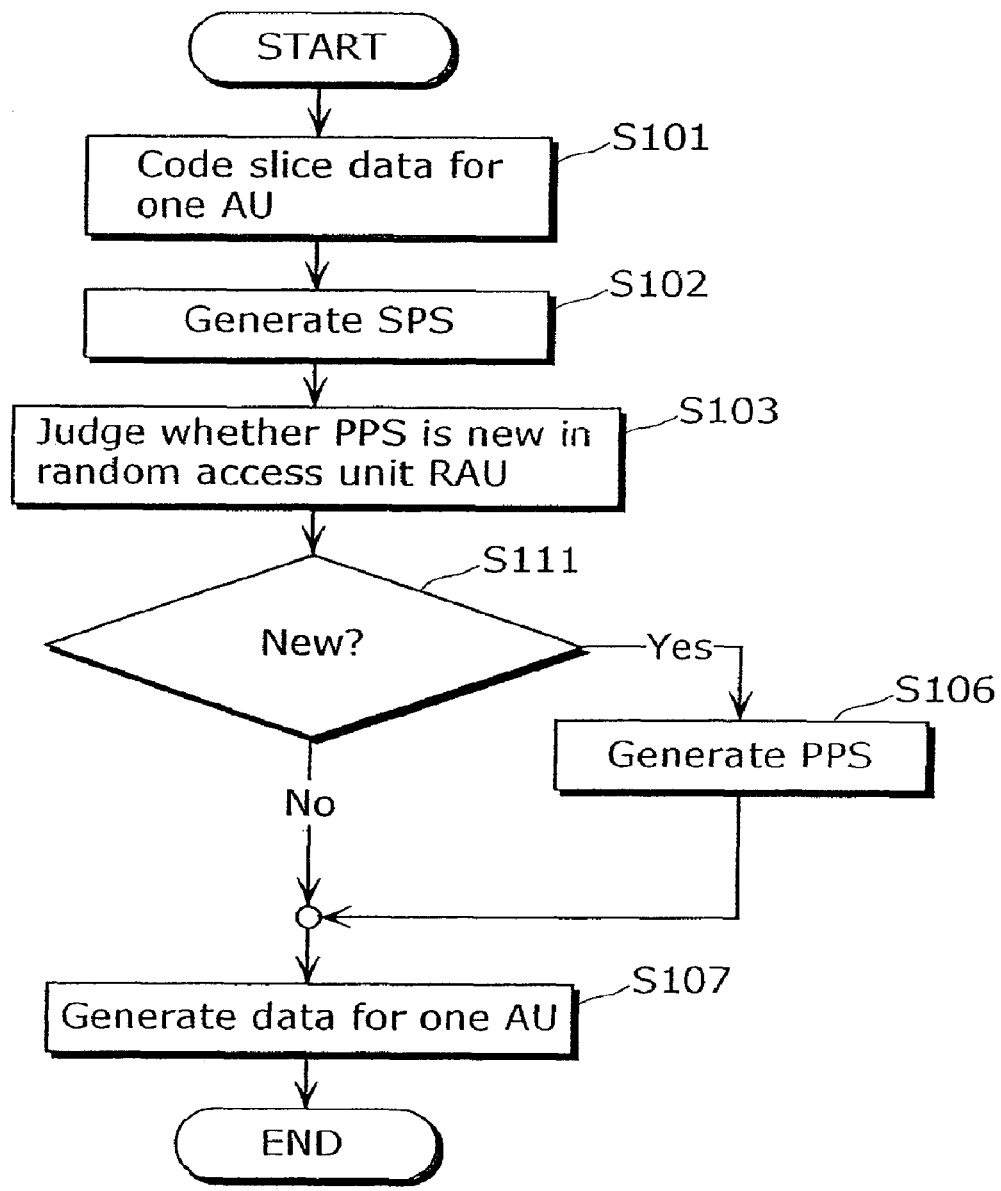
FIG. 5 is a flowchart showing an operation of the conventional picture coding apparatus.

In the flowchart, same marks are assigned to the steps same as in the conventional coding method shown in FIG. 5, and the explanations about the same steps are omitted here. In step S104, the picture coding apparatus 10 judges whether or not to store the PPS into the AU so as to be able to obtain the PPS necessary for decoding the trick-play AU from the trick-play AU, based on the judgement result obtained in step S103 and information indicating whether the AU which is in generation, and the procedure moves on to step 105. When it is judged that to store PPS (Yes in step S105), the procedure moves on to step S106 and the picture coding apparatus 10 generates a PPS. After that, the procedure moves on to step S107 and the picture coding apparatus 10 generates data for one AU.

On the other hand, when it is judged not to store PPS (No in step S105), the procedure moves directly on step S107.

In step S107, when it is judged to store PPS in step S105, the picture coding apparatus 10 includes the PPS generated in step S106 in the AU so as to generate data for one AU, and outputs the generated data. It should be noted that when the PPS which has been stored in an AU that is not a trick-play AU is stored again in the trick-play AU, the picture coding apparatus 10 may stores the held PPS in step S107 without generating a PPS again in step S106.

Further, a trick-play AU may be determined in accordance with a coding type as, for example, determining I pictures and P pictures are trick-play pictures, and may be determined dynamically in accordance with a predictive structure among pictures.

Figure 10:
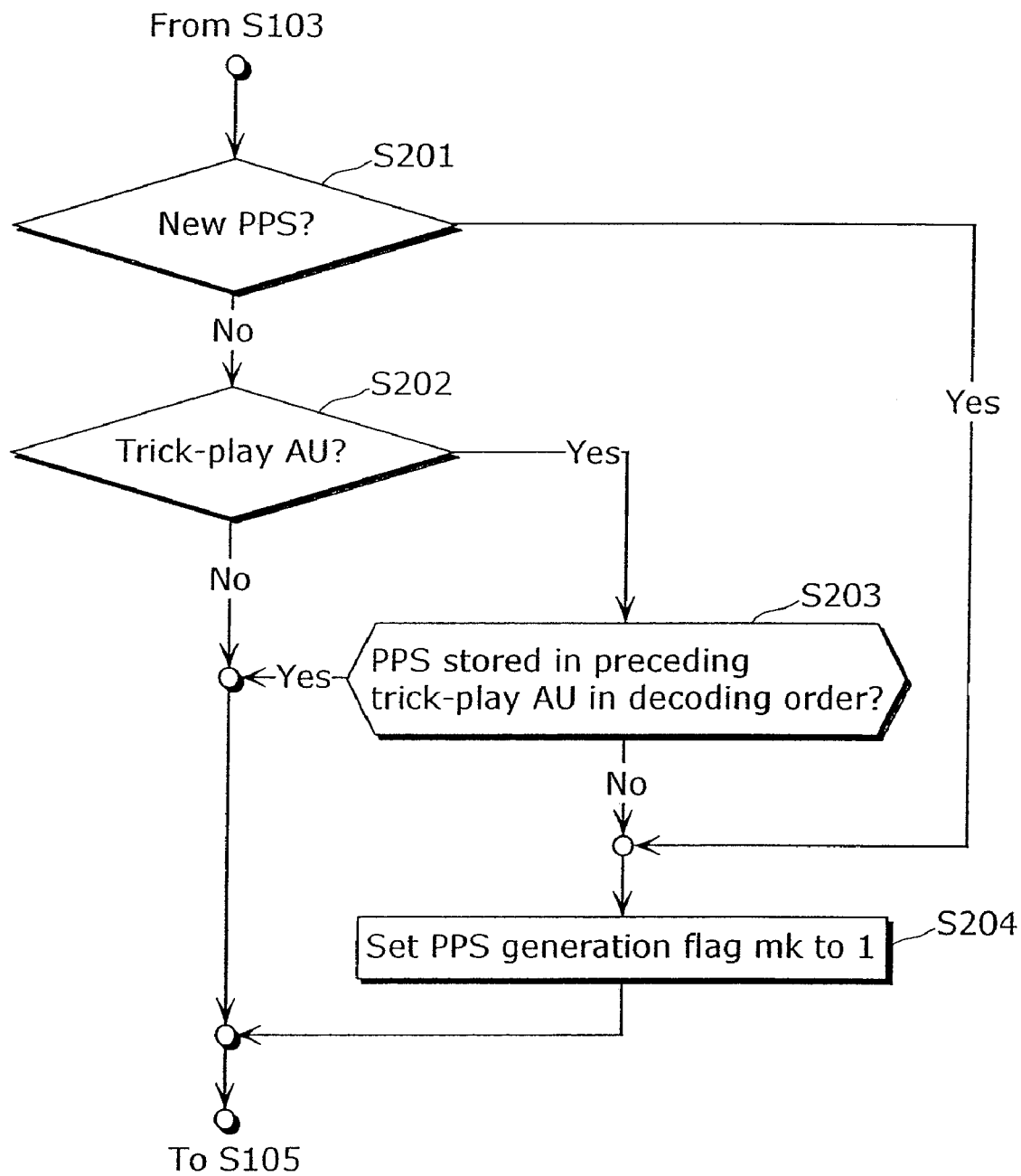
FIG. 10 is a first flowchart showing an operation of determining an arrangement of a PPS in the picture coding apparatus according to the first embodiment of the present invention.

FIG. 10 is a flowchart showing in detail about processing in step S104.

Here, an initial value of a PPS generation flg mk is presumed to be 0. In step S201, the picture coding apparatus 10 judges whether or not the new PPS flag flg set in step S103 is 1 (whether or not the PPS is new). The picture coding apparatus 10 moves on to step S204 when the new PPS flag flg is 1, and moves on to step S202 when the new PPS flag flg is 0. In step S202, the picture coding apparatus 10 judges whether or not the AU which is in generation is a trick-play AU based on the trick-play information trk, moves on to step S203 when the AU is the trick-play AU, and moves on to step S105 in FIG. 9 when the AU is not the trick-play AU.

In step S203, the picture coding apparatus 10 judges whether or not the PPS is stored in a trick-play AU which is preceding to the mentioned trick-play AU in decoding order in a same random access unit RAU. If the PPS has already been stored, the processing is terminated. While, if the PPS has not been stored, the picture coding apparatus 10 moves on to step S204. In step S204, the picture coding apparatus 10 sets a PPS generation flg mk to 1, and moves on to step S105 in FIG. 9.

It should be noted that there are two methods of updating a PPS: a method of newly generating a PPS which has a different ID number that is an identifier of a PPS; and a method of overwriting a PPS which has a same ID number. When the PPS having the same ID number is written over the PPS, the pre-overwritten PPS is invalidated. Accordingly, in the judgement processing in steps S103 and S104, it is necessary to compare not only the ID numbers of the PPS but also information indicated by the PPS themselves. However, when it is prohibited to overwrite a PPS with a same ID number under operation standard and the like, the PPS may be identified by the ID number.

Figure 11:
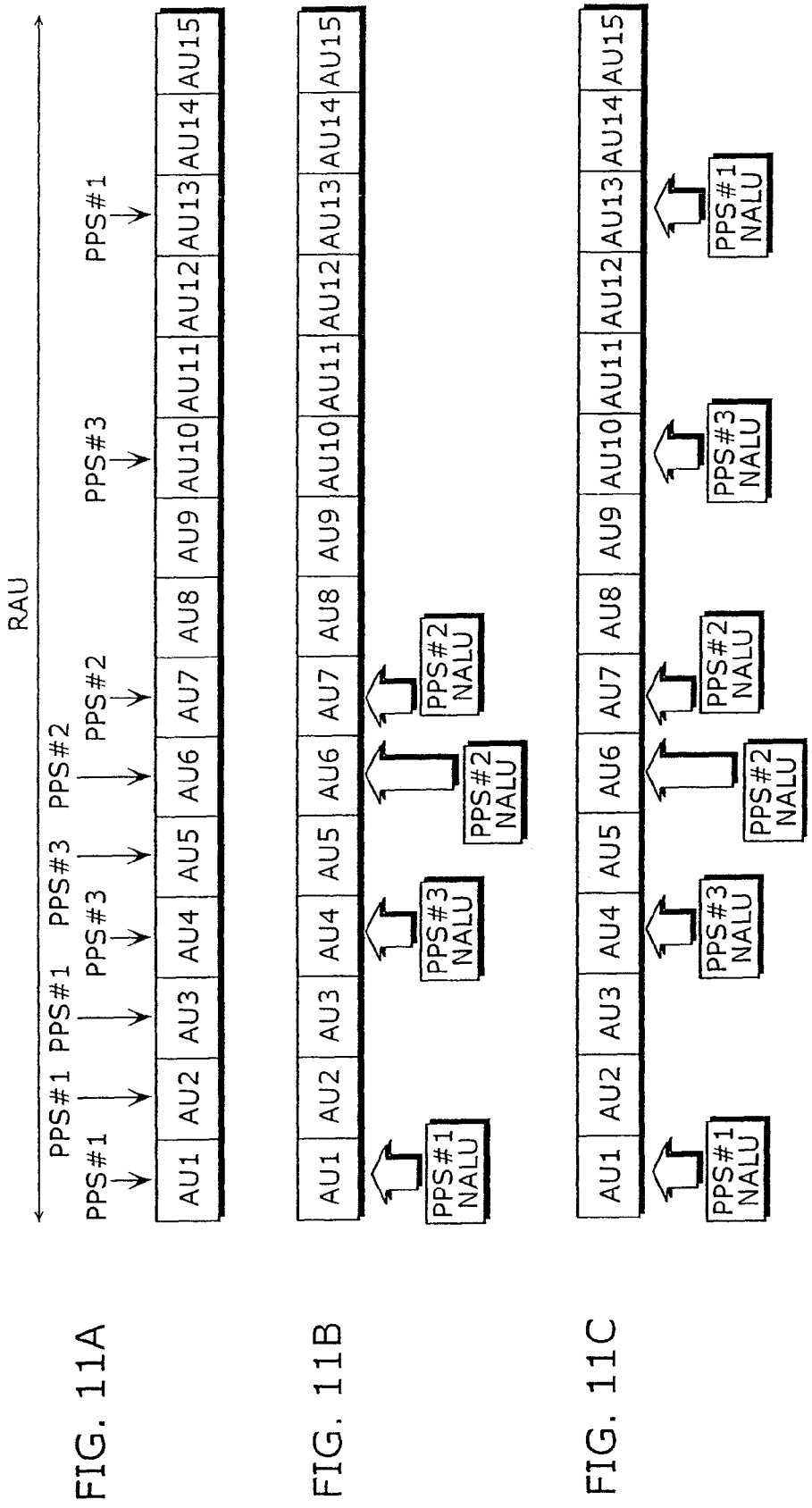
FIG. 11A, FIG. 11B and FIG. 11C show a first structural example of an output stream of the picture coding apparatus according to the first embodiment of the present invention.

FIGS. 11A, 11B and 11C are drawings showing an example of a structure of a random access unit RAU in a stream generated by the picture coding method of the present invention.

As shown in FIG. 11A, the random access unit RAU is made up of fifteen AUs from AU1 to AU15 according to the decoding order. Further, five AUs of AU1, AU4, AU7, AU10 and Au13 are presumed to be trick-play AUs. Here, AU1, AU4, AU7, AU10 and AU13 respectively refer to, as PPS, PPS#1, PPS#3, PPS#2, PPS#3, and PPS#1. Furthermore, AU6 refers to PPS#2 and is a first AU which holds PPS#2 in the random access unit RAU. Also, AU2 and AU3 refer to PPS#1 and AU5 refers to PPS#3.

FIG. 11B shows NAL units of PPS held in respective AUs. In the random access unit RAU, PPS#1 is referenced first in AU1, and PPS#3 is referenced first in AU4. Accordingly, PPS#1 and PPS#3 are respectively stored in AU1 and AU4. Next, while PPS#2 is stored in AU6, AU7 is the first trick-play AU which refers to PPS#2. Therefore, PPS#2 is also stored in AU7. AU10 and AU13 respectively refer to PPS#3 and PPS#1. However, they are not stored in AU10 and AU13 since they have already been stored in AU4 and AU1 that are trick-play AUs.

It should be noted that in the trick-play AU, the PPS referenced by the current AU may be stored definitely in the AU itself.

FIG. 11C shows an example of PPS storage when the PPS referenced by the trick-play AU is stored definitely in the trick-play AU itself. As shown in FIG. 11C, PPS#3 and PPS#1 respectively referenced by AU10 and AU13 have already been stored in AU4 and AU1 that are trick-play AUs. However, they are stored again in AU10 and AU13.

It should be noted that multiple NAL units of PPS can be stored in one AU. Therefore, in the first AU of the random access unit RAU, all PPS necessary for decoding AUs in the random access unit RAU may be stored, or all PPS necessary for decoding trick-play AUs may be stored.

Further, one or more PPS that are frequently used may be stored in a first AU of the random access unit RAU as a default PPS, while a PPS may be stored in a picture each time when a PPS that is different from the default PPS is referenced in the front AU or in the AU following the front AU. The default PPS can be prepared, for example, in accordance with a coding type of an I picture, a P picture, a B picture to be referenced, or a B picture that is not referenced.

In addition, the PPS necessary for decoding trick-play AUs may be stored both in the first AU of the random access unit RAU and each trick-play AU.

It should be noted that the AUs other than trick-play AUs may definitely hold the PPS referenced by said AUs.

Note that, in a trick play AU, a PPS necessary for decoding AUs other than trick-play AUs that follow said trick-play AU in decoding order in the random access unit may be stored. For example, PPS necessary for decoding all AUs other than trick-play AUs are stored in a first AU of the random access unit RAU. Accordingly, when trick-play is reset to ordinary playback such as when AUs of I pictures and P pictures are only decoded and displayed for the first portions of AUs in the random access unit RAU, and all AUs are decoded and displayed for the rest of AUs, PPS necessary for decoding all AUs after the trick-play are set to ordinary playback can be obtained without obtaining PPS stored in the skipped AUs.

Next, information indicated by SPS includes information which can be overwritten with PPS such as a quantization matrix. For example, in the case where an AU refers to SPS having an ID number 1 (SPS(1)) and to PPS having an ID number 2 (PPS(2)), and the PPS(2) overwrites a quantization matrix in SPS(1), a quantization matrix shown in PPS(2) is used when the AU is decoded. The SPS referenced by the AU can be switched only in the AUs of IDR pictures. Therefore, when an AU in the random access unit RAU switches a reference SPS, the first AU of an ordinary random access unit RAU is determined as an AU of the IDR picture. However, if the AU of the IDR picture is used, an AU which follows the AU of the IDR picture cannot refer to an AU which is prior to the IDR picture. Therefore, coding efficiency may be decreased. Here, in SPS, when a parameter updatable by PPS is only updated among SPS, the SPS is not updated but can be replaced by updating the PPS.

Figure 12:
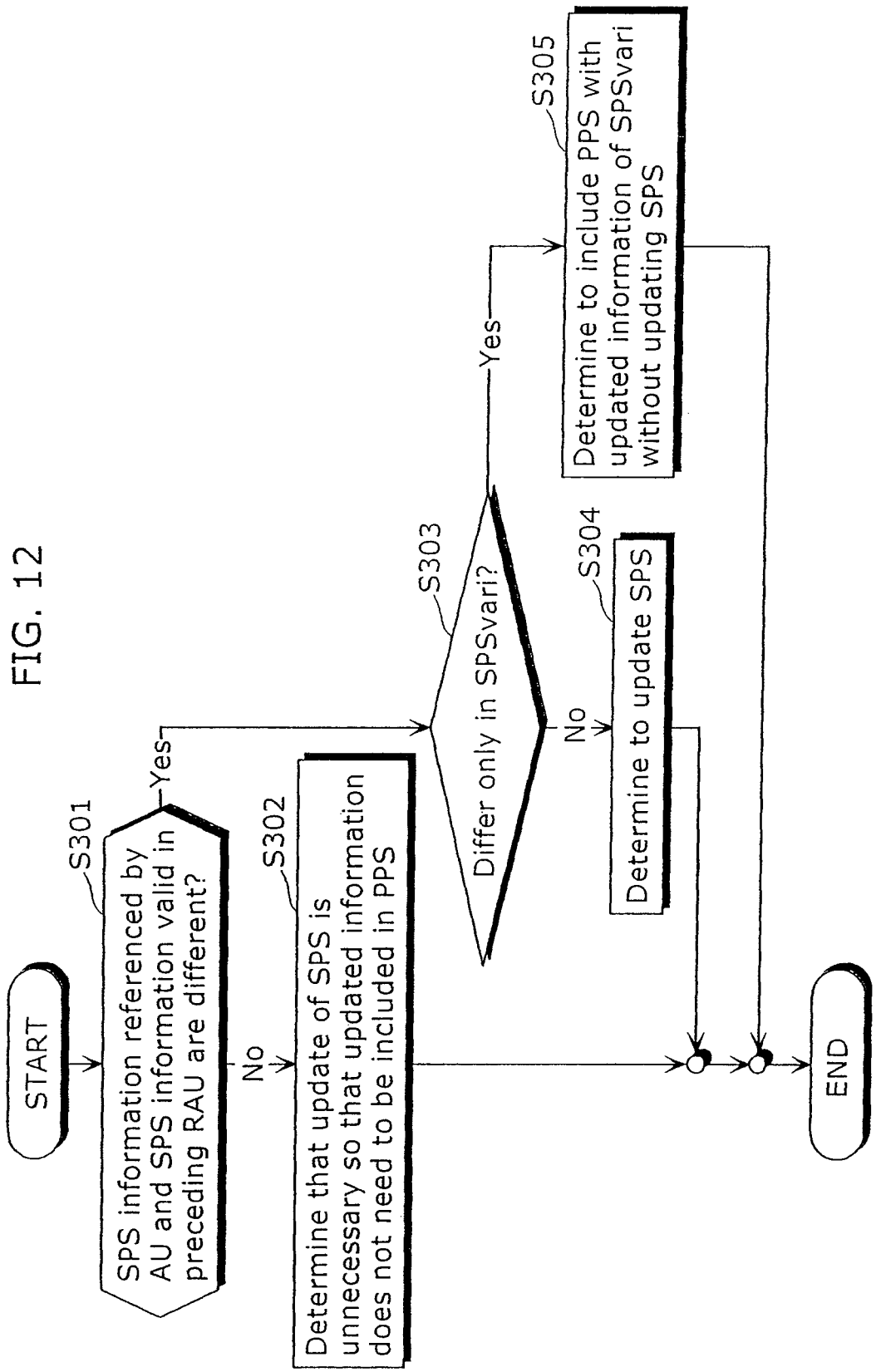
FIG. 12 is a second flowchart showing an operation of determining an arrangement of the PPS in the picture coding apparatus according to the first embodiment of the present invention.

FIG. 12 is a flowchart showing a process of determining whether or not to update the SPS stored in the first AU of the random access unit RAU from the SPS referenced by an AU of an immediately preceding random access unit RAU.

First, in step S301, the picture coding apparatus 10 judges whether or not the SPS information referenced by the first AU is different from the SPS information referenced by the AU of the immediately preceding random access unit. The picture coding apparatus 10 moves on to step S303 when it is judged that they are different from one another, while it moves on to step S302 when it is judged that they are the same. Here, the SPS information includes both of information that can be set only in the SPS and information that is updatable in the PPS.

In step S302, the picture coding apparatus 10 determines that it is unnecessary to update the SPS and to update information of the SPS by the PPS.

In step S303, the picture coding apparatus 10 judges whether or not the difference is only the data updatable by the PPS (referred to as SPSvari). The picture coding apparatus 10 moves on to step S305 when it is judged that the difference is only the SPSvari, while it moves on to step S304 when it is judged that there are differences other than the SPSvari. In step S304, the picture coding apparatus 10 determines to update the SPS and terminates the processing. In step S305, the picture coding apparatus 10 determines to store the PPS including update information of the SPSvari into an AU without updating the SPS, and terminates the processing.

From the processing result, when it is determined that the SPS is not updated, the first AU of the random access unit RAU can be an AU of an I picture other than an IDR picture instead of an AU of the IDR picture. It should be noted that the above judgement processing is not necessary when it is wished to make the first AU of the random access unit RAU as an AU of the IDR picture as in the case of changing a scene.

Figure 13A:
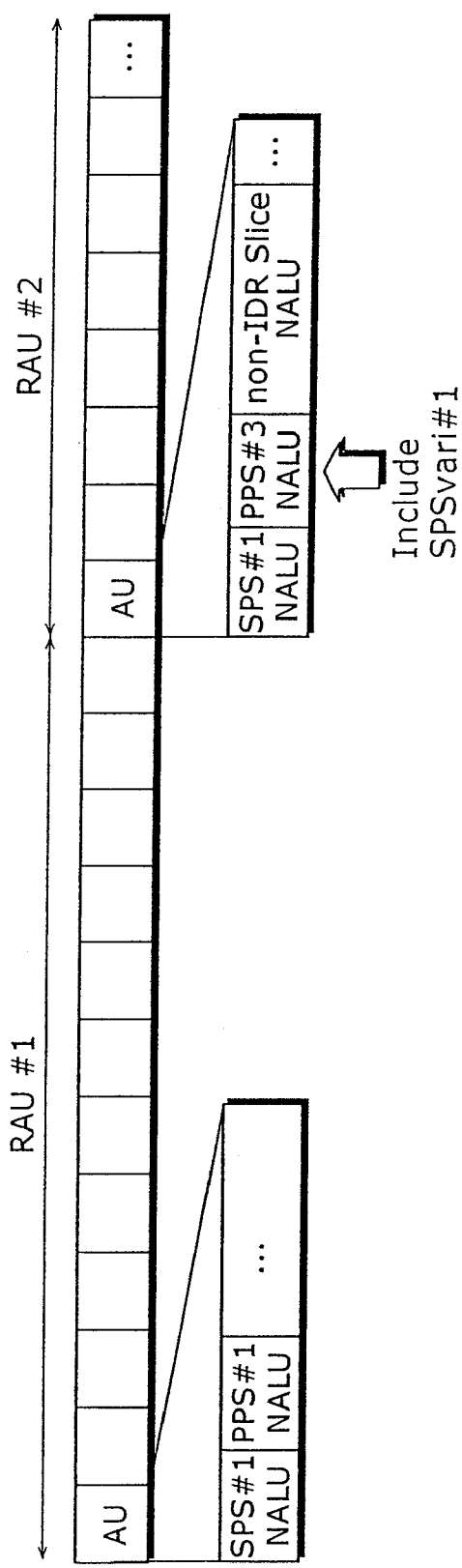
FIG. 13A and FIG. 13B show a first structural example of the output stream of the picture coding apparatus according to the first embodiment of the present invention.
Figure 13B:
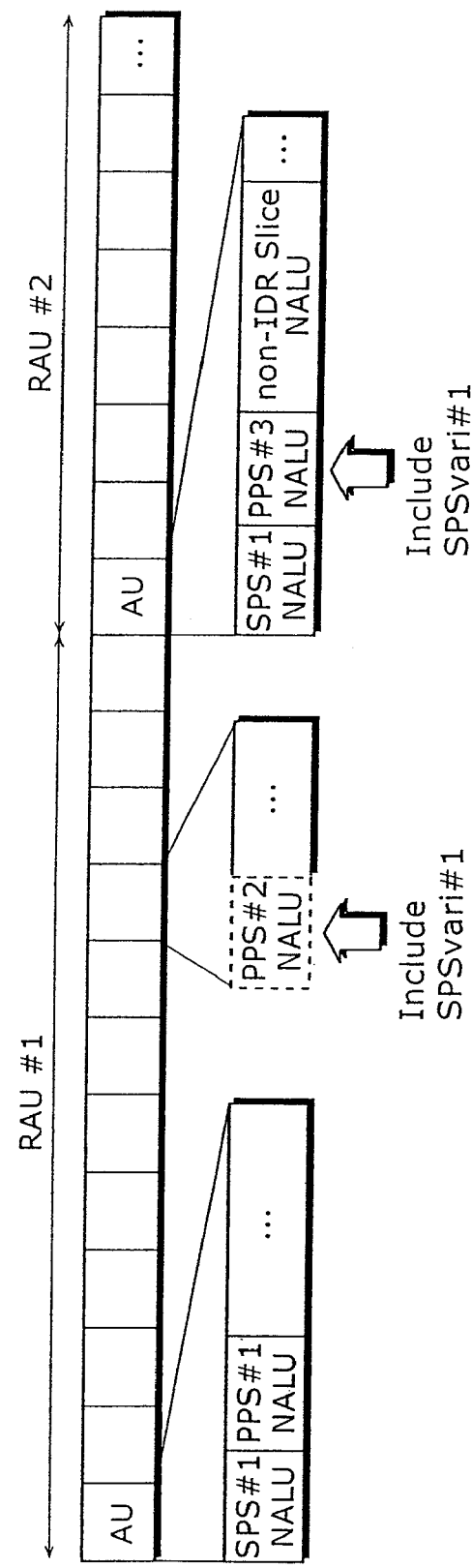

FIGS. 13A and 13B show an example of a data structure of the random access unit RAU generated by the method shown in FIG. 12.

In FIG. 13A, the difference of SPS data referenced by RAU#1 and RAU#2 that are consecutive two random access units RAUs is only SPSvari#1 that is data updatable by the PPS. Herein, in RAU#2, an AU of an I picture can be a head AU by including the PPS having data of SPSvari#1 into the first AU.

In FIG. 13B, in an AU of RAU#1, the SPSvari#1 is updated by the PPS. The updated SPS information is also used in the RAU#2. Herein, the PPS stored in the first AU of RAU#2 also includes the SPSvari#1.

Note that, flag information indicating that it is guaranteed that PPS necessary for decoding trick-play AUs can be obtained by decoding only the trick-play AUs may be indicated in the random access unit RAU. For example, the flag information can be stored in a nal_ref_idc field in a header of a NAL unit such as SPS and PPS, or a NAL unit which defines another type, a SEI message and the like. Here, the nal_ref_idc field is a 2 bits field that is determined to take a value of 0 or a value of one or higher for each type of a NAL unit. For example, the NAL unit such as SPS and PPS takes a value of one or higher. Therefore, the flag information can be indicated by any one of values that is one or higher.

Also, in the first AU of the random access unit RAU, the flag information may be indicated, indicating that all PPS necessary for decoding AUs in the random access unit RAU are stored.

Note that, while the storage method of PPS is explained in the above, the information may be other than PPS if it is initialization information on an access unit basis or information for updating initialization information commonly referenced by multiple access units.

Note that, coding method is not limited to MPEG-4 AVC and other methods can be applicable if initialization information can be updated at the specified unit.

(Variation)

The picture coding apparatus 10 in the above mentioned embodiment judges whether or not a target AU is a trick-play AU, and stores, when it is judged that the target AU is the trick-play AU, a PPS to be referenced for decoding the trick-play AU into the trick-play AU or into a trick-play AU which is preceding to said trick-play AU in decoding order.

A picture coding apparatus according to the variation stores the PPS to be referenced for decoding a target AU into the first AU of a random access unit RAU or into the AU itself which refers to the PPS, without judging whether or not the target is the trick-play AU.

Here, the first AU of the random access unit RAU is a trick-play AU so that a PPS can be obtained properly and promptly so as to decode an AU (picture) even at the time of trick-play, if storing the PPS in the first AU or in the AU itself that refers to the PPS as described in the above.

Figure 14:
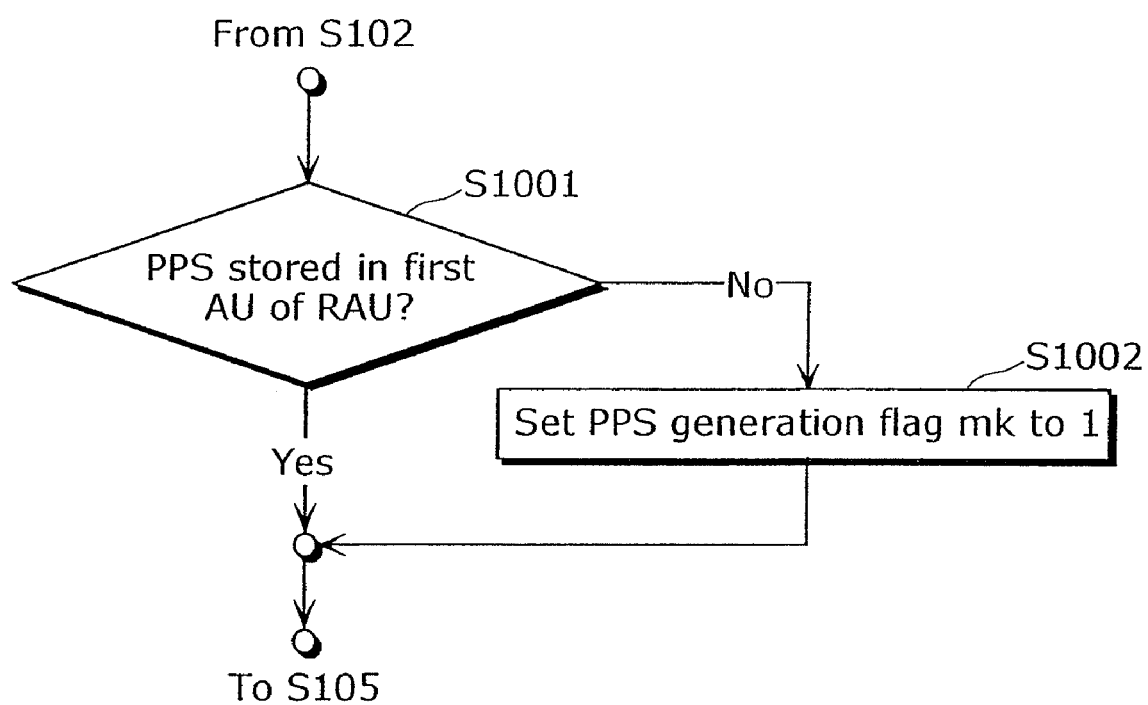
FIG. 14 is a flowchart showing an operation of the picture coding apparatus according to the first embodiment of the present invention.

FIG. 14 is a flowchart showing a portion of a process of the picture coding method according to the variation.

Comparing to the picture coding method shown in FIG. 9, the picture coding method according to the present variation differs in processes of steps S103 and S104. In other words, the picture coding method according to the present variation performs processing of steps S1001 and S1002 shown in FIG. 14 instead of the processing of steps S103 and S104 shown in FIG. 9.

Specifically, the picture coding apparatus judges whether or not the PPS of the target AU is the PPS which has already been stored in the first AU of the random access unit RAU (step S1001).

Here, in the case where the picture coding apparatus judges that the PPS is the PPS which has already been stored in the first AU (Yes in step S1001), it performs processing of step S105 shown in FIG. 9 while maintaining a state where the PPS generation flag mk is set to 0.

On the other hand, in the case where the picture coding apparatus judges that the PPS is not the PPS which has already been stored in the first AU (No in step S1001), it sets the PPS generation flag to 1 (step S1002), and performs processing of step S105 shown in FIG. 9.

It should be noted that, in such picture coding method, it is not necessity to previously store the multiple PPS in the first AU of the random access unit RAU.

In the case where the multiple PPS are previously stored, the PPS referenced by the target AU is compared to the multiple PPS previously stored in the first AU. Then, if the PPS of the target AU differs from any of the multiple PPS, the PPS is stored in the target AU itself.

On the other hand, in the case where the multiple PPS are not previously stored, a PPS referenced by the first AU is stored in the first AU. Similarly for each of other AUs, a PPS referenced by an AU is stored in the AU. It is also possible to store the PPS into each AU other than the first AU if the PPS referenced by the AU is different from the one stored in the first AU.

Further, all PPS to be referenced for decoding respective AUs included in the random access unit RAU may be stored in the first AU of the random access unit RAU. In such case, for example, the picture coding apparatus stores all PPS into the first AU after coding all pictures to be included in the random access unit RAU or determining the coding type of all the pictures in the random access unit RAU. It should be noted, that while multiple PPS can be stored in the first AU, the processing load at the time of decoding increases as the number of PPS stored at once in the first AU increases. Accordingly, the maximum number of PPS that can be stored in the first AU at once may be determined. The maximum number can be determined based on the maximum number of pictures that make up a random access unit RAU or considering the processing load. For example, if the maximum number of frames that can be stored in the random access unit RAU is 15, the maximum number of PPS can be determined as 15. Herein, the PPS which cannot be stored in the first AU due to the upper limit is stored in an AU which refers to the PPS.

Furthermore, according to the present method, the number of PPS to be stored in an AU following to the first Au in the random access unit RAU can be set to 0 or 1 so that the PPS can be efficiently stored.

Thus, in the present variation, in the generated random access unit RAU, PPS necessary for decoding each AU is stored in the first AU of the random access unit RAU or in the AU itself. Therefore, even in the case where trick-play of selecting and playing back at least the head AU from among all AUs included in such random access unit, the selected AU can be decoded by obtaining it properly and promptly without failing to obtain the PPS necessary for decoding the selected AU. Consequently, the trick-play can be smoothly performed.

Second Embodiment

Figure 15:
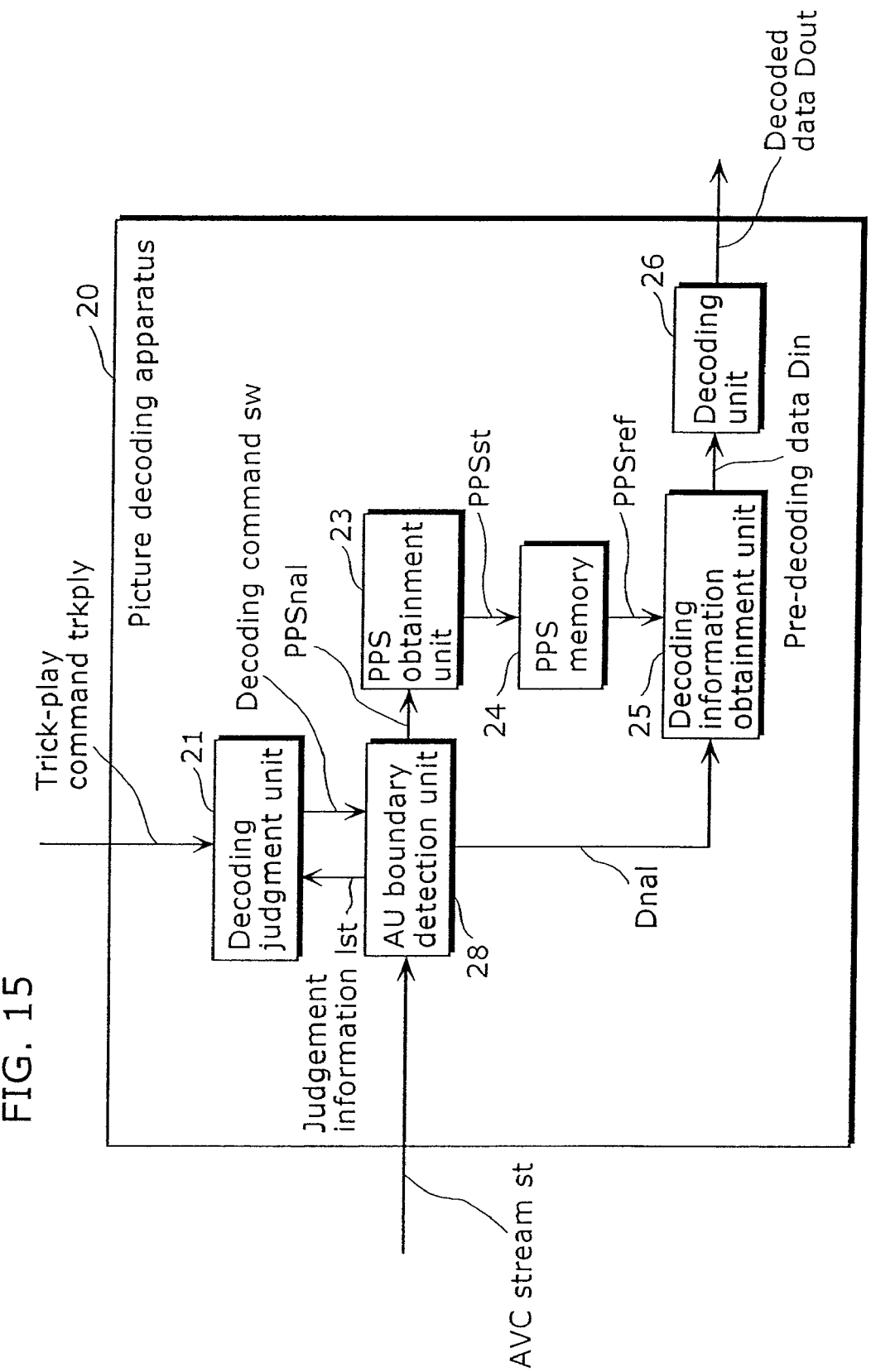
FIG. 15 is a block diagram showing a picture decoding apparatus according to a second embodiment of the present invention.

FIG. 15 is a block diagram showing a picture decoding apparatus which realizes a picture decoding method of the present invention.

Figure 6:
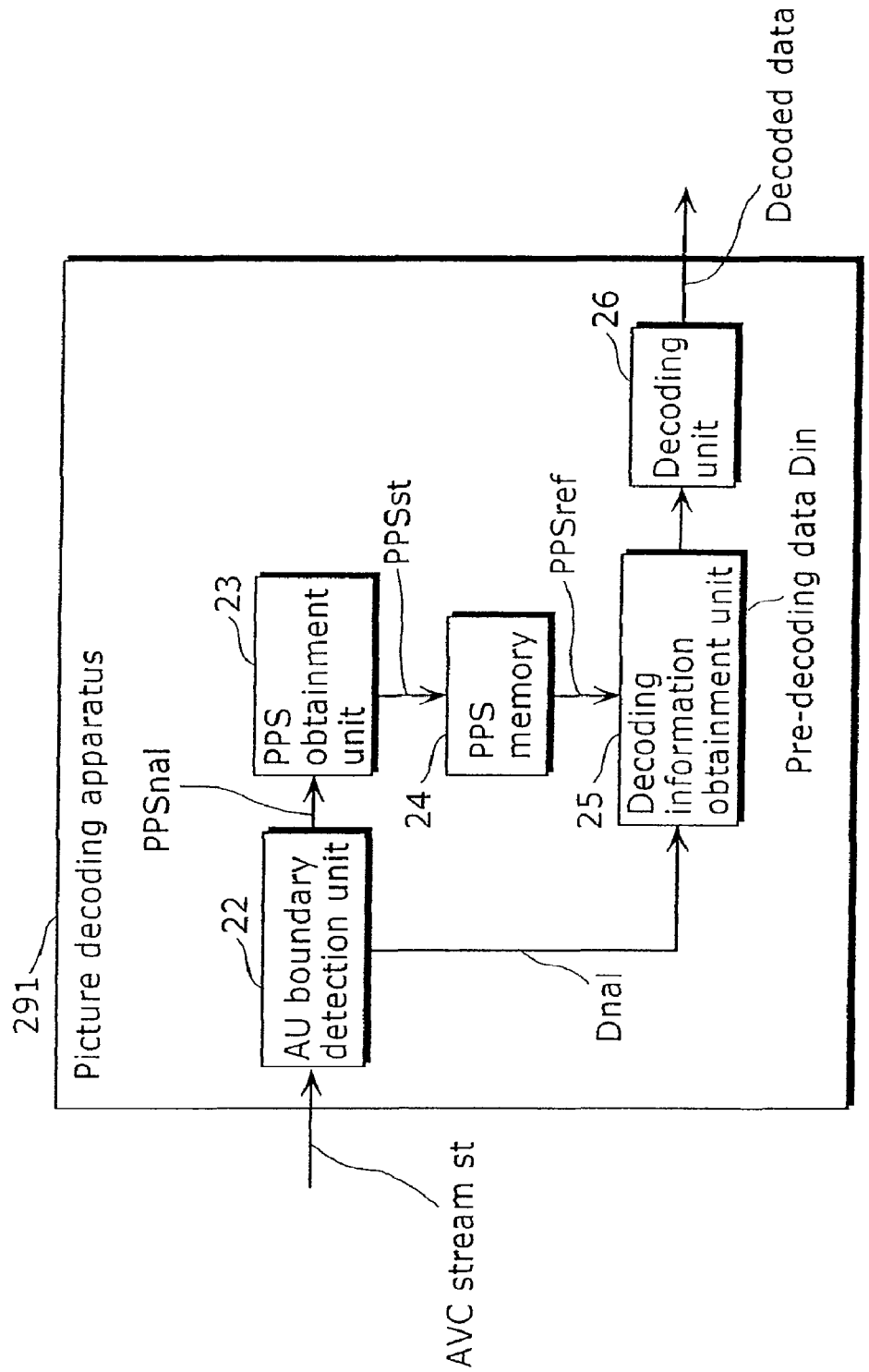
FIG. 6 is a block diagram showing a structure of the conventional picture decoding apparatus.
Figure 7A:
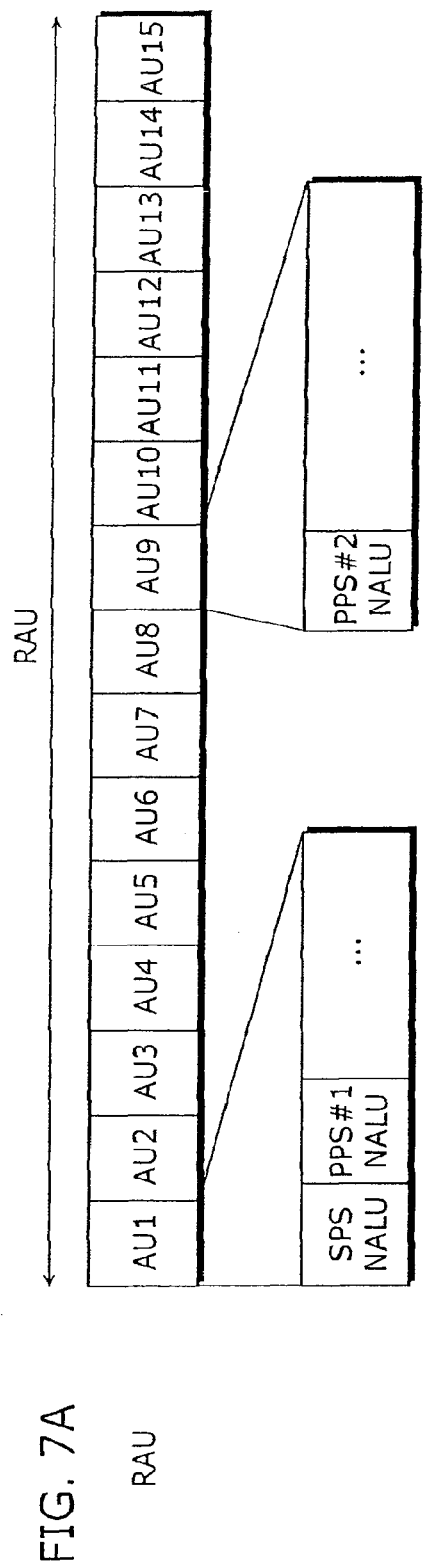
FIG. 7A and FIG. 7B are illustrations explaining a problem of the conventional picture coding apparatus.
Figure 7B:
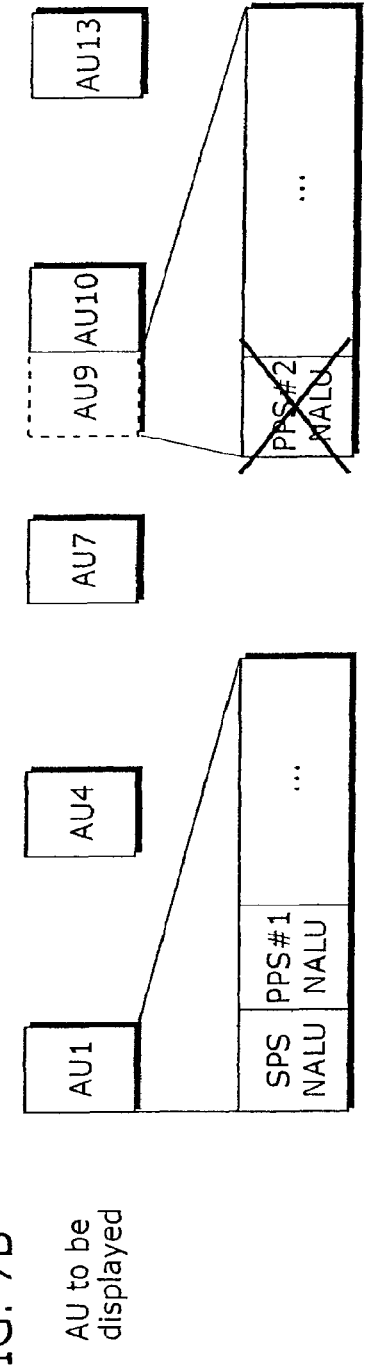

In the diagram, same numbers are assigned to constituents which perform same operations as the constituents of the picture decoding apparatus which realizes the conventional picture decoding method shown in FIG. 6, and the detailed explanations about the same constituents are omitted here. The difference of the present picture decoding apparatus with the conventional picture decoding apparatus is to select and decode only the trick-play AUs at the time of trick-play such as variable-speed playback and inverse playback.

A picture decoding apparatus 20 of the present invention includes a decoding judgement unit 21 in addition to the constituents of the conventional picture decoding apparatus. A stream of MPEG-4 AVC (AVC stream st) coded by the picture coding apparatus according to the first embodiment is inputted to the picture decoding apparatus 20.

An AU boundary detection unit 28 detects boundaries of AUs, separates the AUs, obtains judgement information lst necessary for judging whether or not to decode each of the separated AUs, and outputs the obtained judgement information lst to the decoding judgment unit 21. At the time of trick-play, a trick-play command trkply is inputted to the decoding judgement unit 21.

When the trick-play trkply is inputted, the decoding judgement unit 21 judges whether or not the AU is a trick-play AU based on the judgement information lst, and outputs a decoding command sw to the AU boundary detection unit 28 when the AU is the trick-play AU. Note that, at the time of ordinary playback of decoding and displaying all AUs, the trick-play trkply is not inputted, and the decoding judgement unit 21 outputs the decoding command sw to all AUs.

The AU boundary detection unit 28 receives the decoding command sw, and outputs information necessary for decoding to each constituent. Specifically, it outputs a NAL unit PPSnal of PPS to a PPS obtainment unit 23, and outputs other NAL units Dnal to a decoding information obtainment unit 25 when the NAL unit of PPS is included in the AU. It should be noted that, only in the case where the trick-play command trkply is inputted to the decoding judgment unit 21, the judgment information lst may be inputted to the decoding judgment unit 21.

Figure 16:
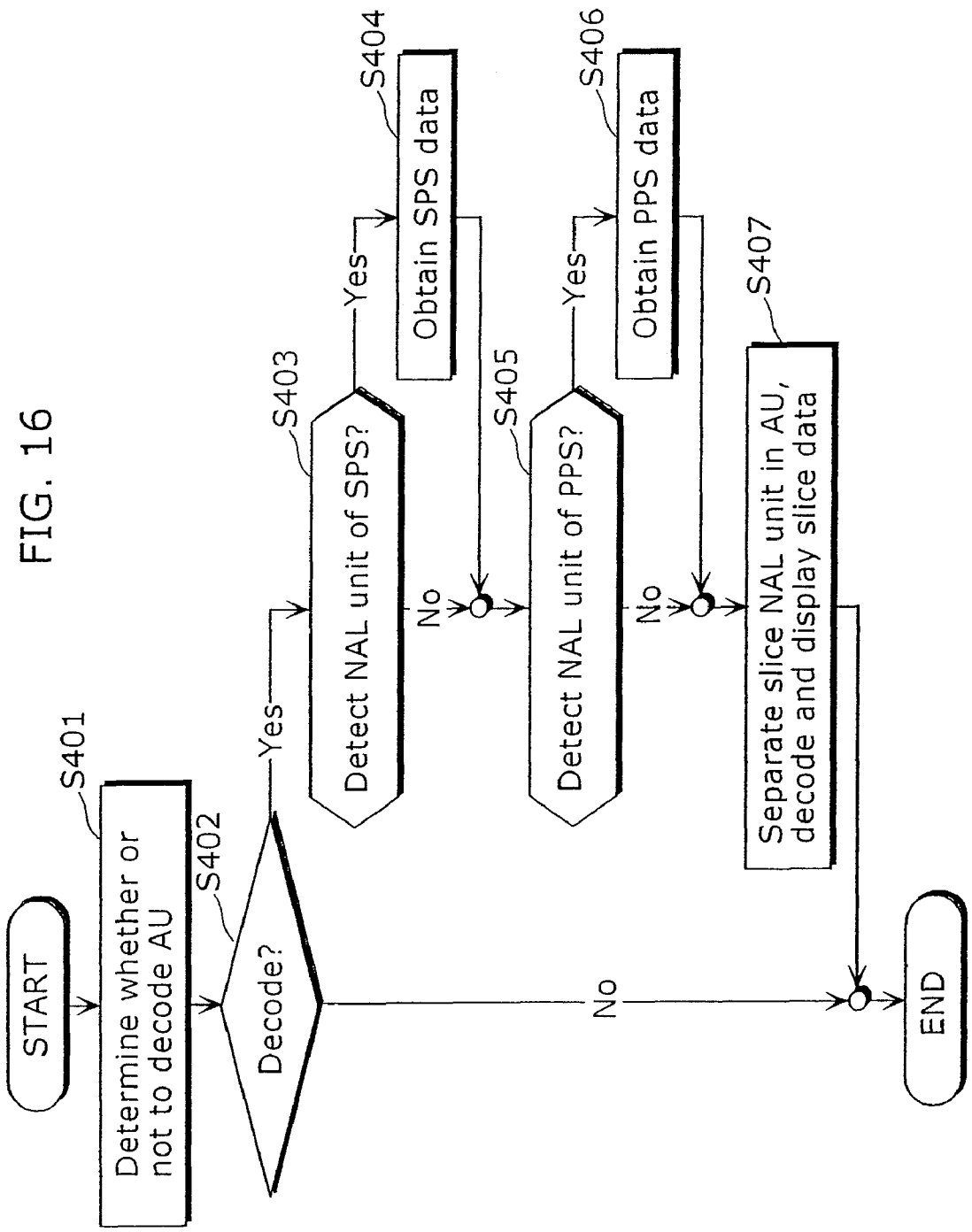
FIG. 16 is a flowchart showing an operation of the picture decoding apparatus according to the second embodiment of the present invention.

FIG. 16 is a flowchart showing an operation of the picture decoding apparatus 20 to decode data for one AU.

First, in step S401, the picture decoding apparatus 20 determines whether or not to decode an AU. At the time of trick-play, it judges whether or not the AU is a trick-play AU, and determines to decode the AU only when the AU is the trick-play AU. Note that, the picture decoding apparatus 20 judges that the first AU of the random access unit RAU is the trick-play AU definitely at the time of trick-play. At the time of ordinary playback, it determines to decode all AUs.

In step S402, the picture decoding apparatus 20 moves on to step S402 when it is determined to decode the AU in step S401, and terminates the processing when it is judged not to decode the AU. In step S403, the picture decoding apparatus 20 searches a NAL unit of SPS, obtains data of the SPS in step S404 if the NAL unit of SPS is detected, and moves on to step S405 if the NAL unit of SPS is not detected. In step S405, the picture decoding apparatus 20 searches a NAL unit of PPS, obtains data of PPS in step S406 if the NAL unit of PPS is detected, and moves on to step S407 if the NAL unit of PPS is not detected. In step S407, the picture decoding apparatus 20 separates NAL units of slice data, and decodes slice data based on data of SPS and PPS obtained from an AU prior to the present AU or in the random access unit RAU in decoding order.

Here, in the case of determining the judgment information lst, it may be determined from each information in an AVC stream such as a value of a primary_pic_type indicating a type of a picture in an Access Unit Delimiter, a value of a slice_type indicating a type of a lice in the slice header, or a value of a nal_ref_idc field in the NAL units such as SPS, PPS and slice, or may be determined based on the information when the list information of trick-play AU is provided. Also, it may be determined from information indicated in database information in a multiplexed format for recording the AVC stream onto a recording medium such as an optical disc.

It should be noted that, in order to deal with an input of the AVC stream st which cannot be guaranteed that the PPS necessary for decoding the trick-play AUs can be obtained from the trick-play AUs, the picture decoding apparatus may search, obtain and hold the PPS for AUs other than the trick-play AUs. It does not need to analyze, for those AUs, the NAL units of slice data or macroblock data in the slice data.

Third Embodiment

Figure 17:
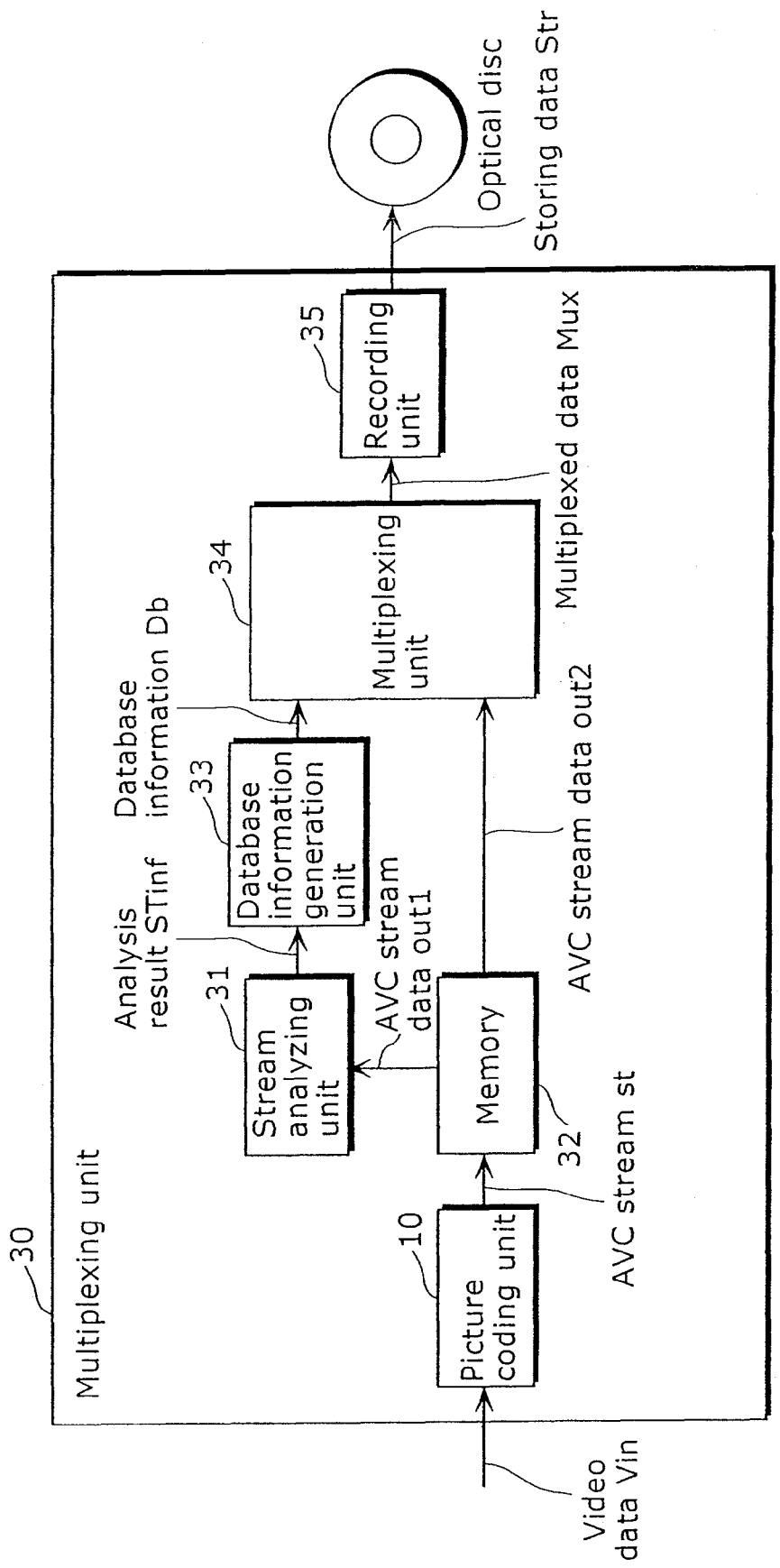
FIG. 17 is a block diagram showing a multiplexer according to a third embodiment of the present invention.

FIG. 17 is a block diagram showing a multiplexer which multiplexes an AVC stream st outputted by the picture coding apparatus of the present invention, and records the multiplexed stream onto a recording medium such as an optical disc and a hard disc.

A multiplexer 30 includes a picture coding unit 10, a memory 32, a stream analyzing unit 31, a database information generation unit 33, a multiplexing unit 34 and a storage unit 35. Here, the picture coding unit 10 is same as the picture coding apparatus of the present invention according to the first embodiment.

The picture coding unit 10 generates an AVC stream st by compressing and coding inputted moving picture data Vin, and records the AVC stream into the memory 32.

The stream analyzing unit 31 reads out AVC stream data out1 recorded in the memory 32, obtains and analyzes decoding and displaying time of AU, information indicating whether or not the AU is the first AU of a random access unit RAU, or information about picture size and video format and the like, and outputs an analysis result STinf to the database information generation unit 33.

The database information generation unit 33 generates, based on the analysis result STinf, database information Db including access information to the AVC stream st, attribute information such as a video format and an aspect ratio, and play list information, and outputs the database information Db to the multiplexing unit 34.

The multiplexing unit 34 multiplexes the management information Db with AVC stream data out2 read out from the memory 32, generates multiplexed data Mux, and outputs the multiplexed data Mux to the storage unit 35. While a multiplexing method is presumed to be a format standardized by a Read Only Format of a Blu-ray Disc (BD) and a Rewritable Format, other multiplexing methods such as a method defined in DVD or HD-DVD and a method adherence to MP4 that is a file format standardized for MPEG. It should be noted that, in the Read Only Format and the Rewritable Format, the coded stream of the MPEG-4 AVC is packetized into the MPEG-2 and then multiplexed.

Further, it should be noted that flag information indicating that PPS necessary for decoding a trick-play AU can be obtained by decoding only the trick-play AU is guaranteed may be stored in the database information of the multiplexed data. Or, the flag information indicating that all PPS in the random access unit RAU are stored in the first AU of the random access unit RAU may be stored in the database information of the multiplexed data.

Fourth Embodiment

A trick-play function is particularly important for an optical disc appliance which plays back a packaged media. First, in a Blu-ray Disc (BD) that is a next generation optical disc, it is explained about an example of recording the multiplexed data Mux of the multiplexing apparatus according to the third embodiment.

First, it is explained about a recording format of a BD-ROM.

Figure 18:
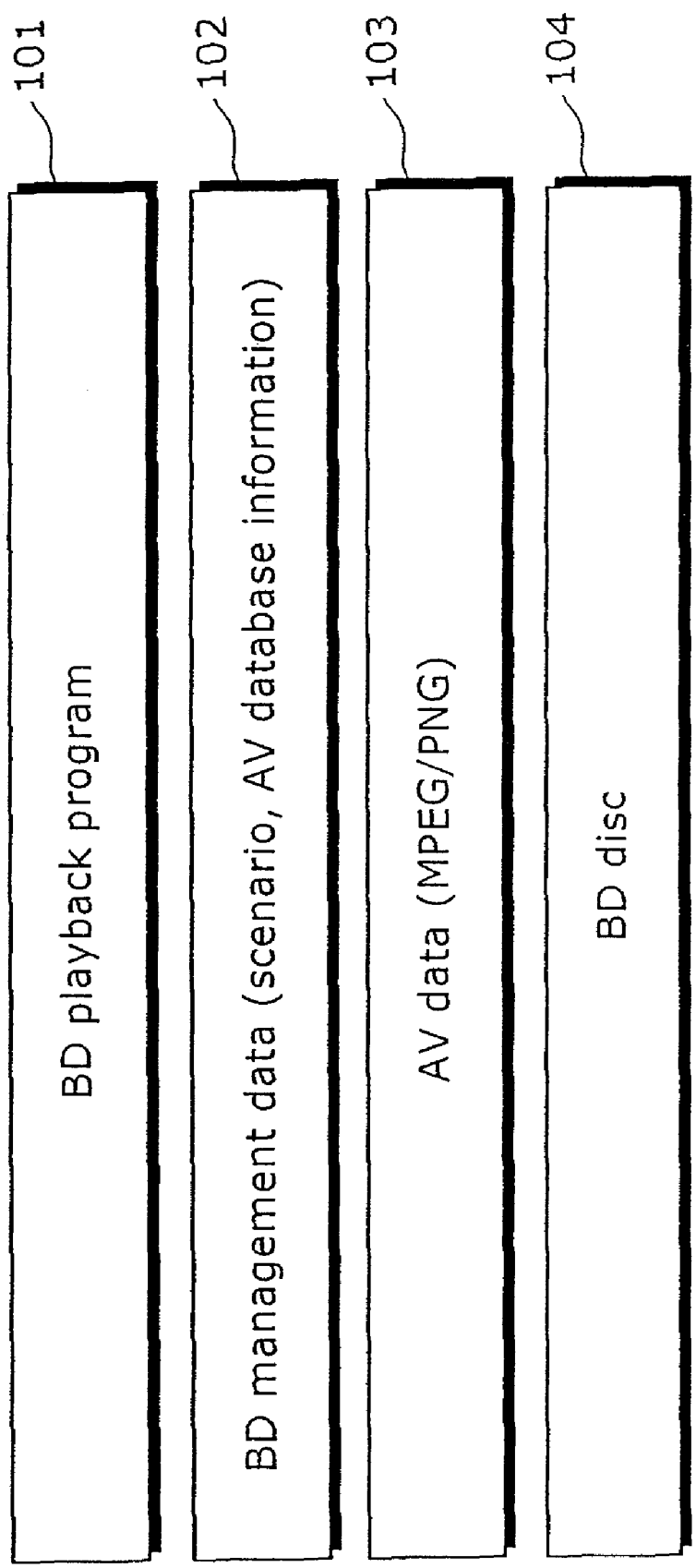
FIG. 18 is a diagram showing data hierarchy of HD-DVD.

FIG. 18 is a diagram showing a structure of a BD-ROM, in particular a structure of a BD disc 104 that is a disc medium and data 101, 102 and 103 recorded on the disc. The data to be recorded on the BD disc 104 are AV data 103, BD database information 102 such as database information relating to the AV data and AU playback sequence, and a BD playback program 101 for realizing an interactive. In the present embodiment, it is explained about a BD disc mainly for an AV application for playing back AV contents in a movie for the purpose of explanation. However, there is no doubt that it is same even if it is used for other uses.

Figure 19:
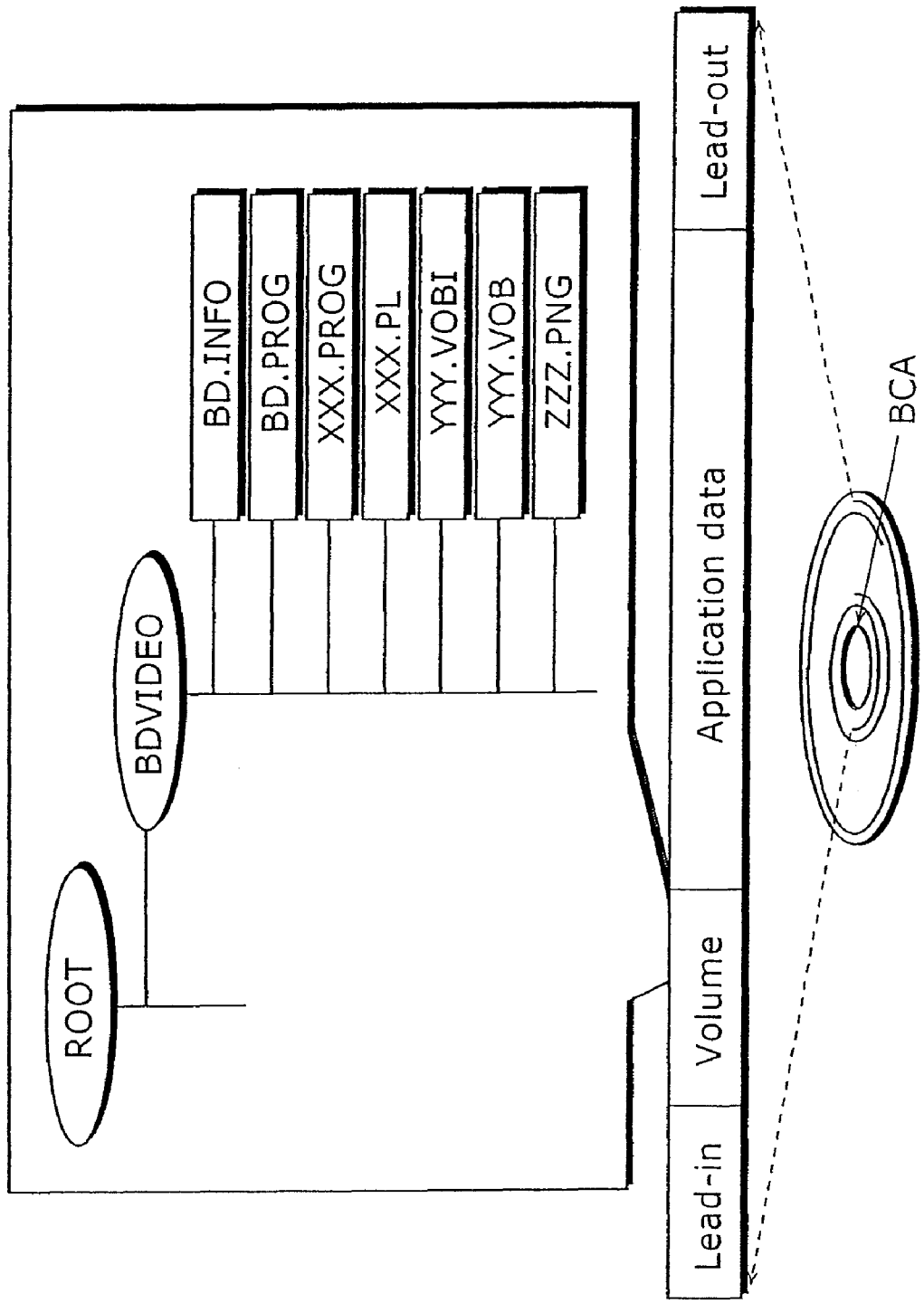
FIG. 19 is a diagram showing a structure of logical space on the HD-DVD.

FIG. 19 is a diagram showing a directory/file structure of logical data recorded on the BD disc. The BD disc has a recording area in a spiral form from the inner radium toward the outer radius as similar to, for example, DVD, CD and the like, and has a logical address space in which logical data can be recorded between a lead-in of the inner radium and a lead-out of the outer radium. Also, there is a special area inside the lead-in which is read only by a drive called a Burst Cutting Area (BCA). This area cannot be read from the application so that it may be used, for example, for a copyright protection technology and the like.

In the logical address space, application data such as video data lead by the final system information (volume) is recorded. As explained in the conventional technology, the file system is a UDF, an ISO96660 and the like. It allows reading out logical data stored as in the ordinal personal computer PC, using a directory and a file structure.

In the present embodiment, as the directory and file structure on the BD disc, a BDVIDEO directory is placed immediately under a root directory (ROOT). In this directory, data (101, 102 and 103 explained in FIG. 18) such as AV contents and database information dealt in the BD are stored.

Under the BDVIDEO directory, the following seven types of files are recorded:

i) BD. INFO (file name fixed)

A file that is one of "BD database information" and information concerning the BD disc as a whole is recoded in the file. A BD player firstly reads out this file.

ii) BD. PROG (file name fixed)

A file that is one of "BD playback program" and playback control information concerning the BD disc as a whole is recorded in the file.

iii) XXX. PL ("XXX" is variable, an extension "PL" is fixed)

A file that is one of "BD database information" and play list information that is a scenario (playback sequence) is recorded in the file. There is one file for each play list.

iv) XXX. PROG ("XXX" is variable, an extension "PROG" is fixed)

A file that is one of "BD playback program" and playback control information for each play list is recorded in the file. A correspondence with a play list is identified by a file body name ("XXX" matches).

v) YYY. VOB ("YYY" is variable, an extension "VOB" is fixed)

A file that is one of "AV data" and VOB (same as VOB explained in the conventional example) is recorded in the file. There is one file for each VOB.

vi) YYY. VOBI ("YYY" is variable, an extension "VOBI" is fixed)

A file that is one of "BD database information" and stream database information concerning VOB that is AV data is recorded in the file. A correspondence with a VOB is identified by a file body name ("YYY" matches).

vii) ZZZ. PNG ("ZZZ" is variable, an extension "PNG" is fixed)

A file that is one of "AV data" and image data PNG (a picture format standardized by W3C, and pronounced as "ping") for structuring subtitles and a menu in the file. There is one file for each PNG image.

With references to FIGS. 20 to 25, it is explained about a structure of navigation data of BD (BD database information).

Figure 20:
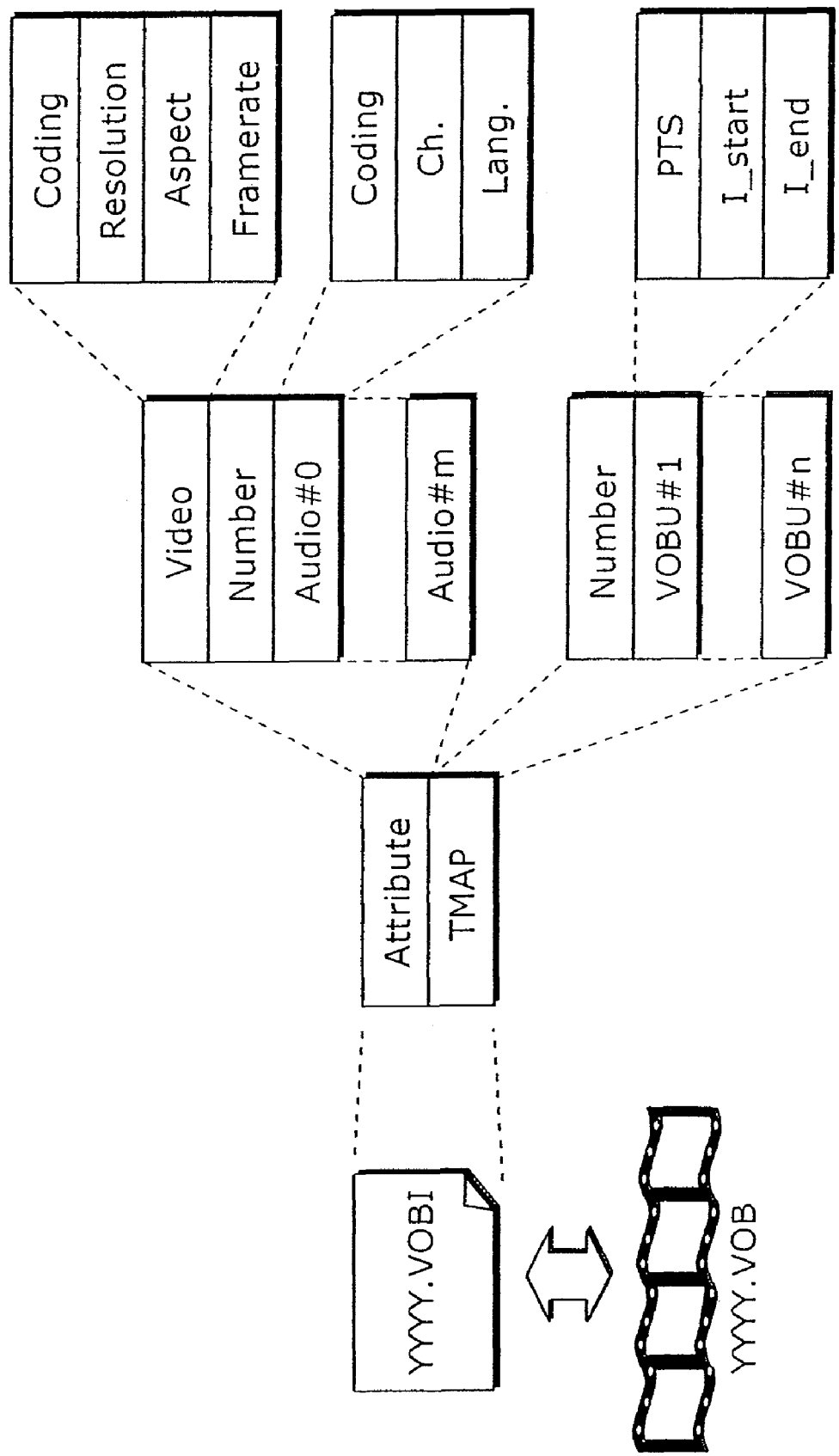
FIG. 20 is a diagram showing structure of a VOB information file.

FIG. 20 is a diagram showing an internal structure of a VOB database information file ("YYY. VOBI").

The VOB database information has stream attribute information (Attribute) of said VOB and a time map (TMAP). There is a stream attribute for each of video attribute (Video) and audio attribute (Audio#01 to Audio#m). In particular, in the case of the audio stream, since the VOB can have audio streams at the same time, the number of audio streams (Number) indicates whether there is a data field or not.

The followings indicate fields of video attribute (Video) and values thereof.

Compression method (Coding):
MPEG1
MPEG2
MPEG3
MPEG4 (Advanced Video Coding)
Resolution:
1920×1080
1440×1080
1280×720
720×480
720×565
Aspect Rate
4:3
16:9
Framerate
60
59.94 (60/1.001)
50
30
29.97 (30/1.001)
25
24
23.976 (24/1.001)

The followings are fields of the audio attribute (Audio) and values thereof.
Compression method (Coding):
AC3
MPEG1
MPEG2
LPCM The number of channels (Ch):
1 to 8
Language Attribute (Language)

A time map (TMAP) is a table having information for each VOBU. The table includes the number of VOBU (Number) held by said VOB and each VOBU information (VOBU#1 to VOBU#n). Each of the VOBU information is made up of an address I_start of an address of a VOBU leading TS packet (I picture start), an offset address (I#end) until the end address of the I picture, and a playback start time (PTS) of the I picture.

Figure 21:
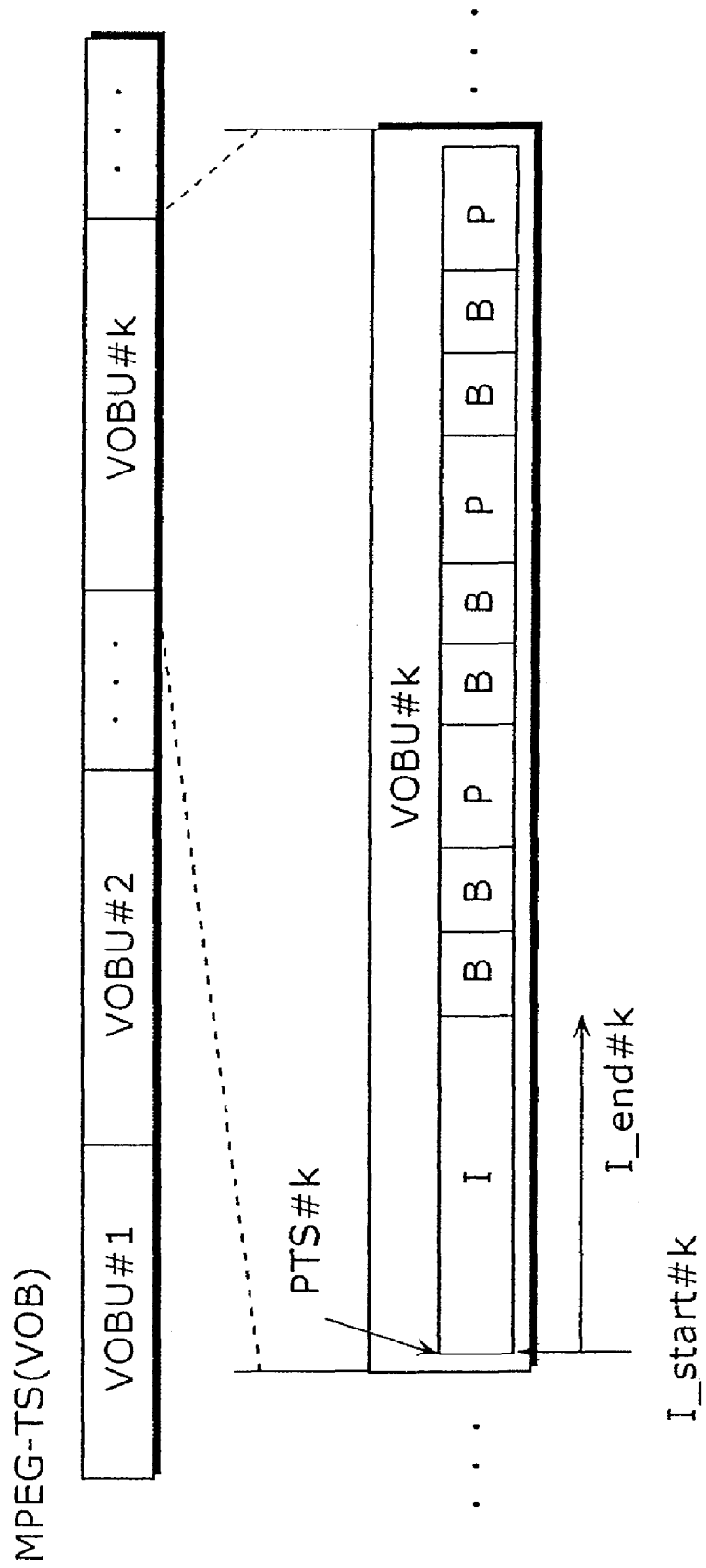
FIG. 21 is an illustration explaining a time map.

FIG. 21 is a diagram explaining details of the VOBU information.

As widely known, there is a case that MPEG video stream is compressed into variable bit rate in order to recording in high picture quality, and there is no simple correspondence between the playback time and the data size. In contrary, an AC3 that is a compression standard of audio compresses audio in a fixed bit rate. Therefore, a relationship between a time and an address can be obtained by a primary expression. However, in the case of a MPEG video data, each frame has a fixed display time, for example, in the case of NTSC, one frame has a display time of 1/29.97 seconds. However, data size of each compressed frame largely changes depending on a characteristic of a picture and a picture type used for compression, specifically I/P/B pictures. Therefore, in the case of MPEG video, a relationship between time and address cannot be described in a primary expression.

As a matter of fact, it is impossible to describe a MPEG system stream which is obtained by multiplexing the MPEG video data in a form of a primary expression. Specifically, VOB also cannot describe time and data size in a primary expression. Therefore, a time map (TMAP) is used for connecting a relationship between time and address in the VOB.

Therefore, when time information is given, first, it is searched in which VOBU the time belongs (tracks PTS for each VOBU), skips the PTS immediately before said time to a VOBU having a TMAP (address specified by I_start), starts decoding pictures from a leading I picture in the VOBU, and starts displaying pictures from a picture of said time.

Figure 22:
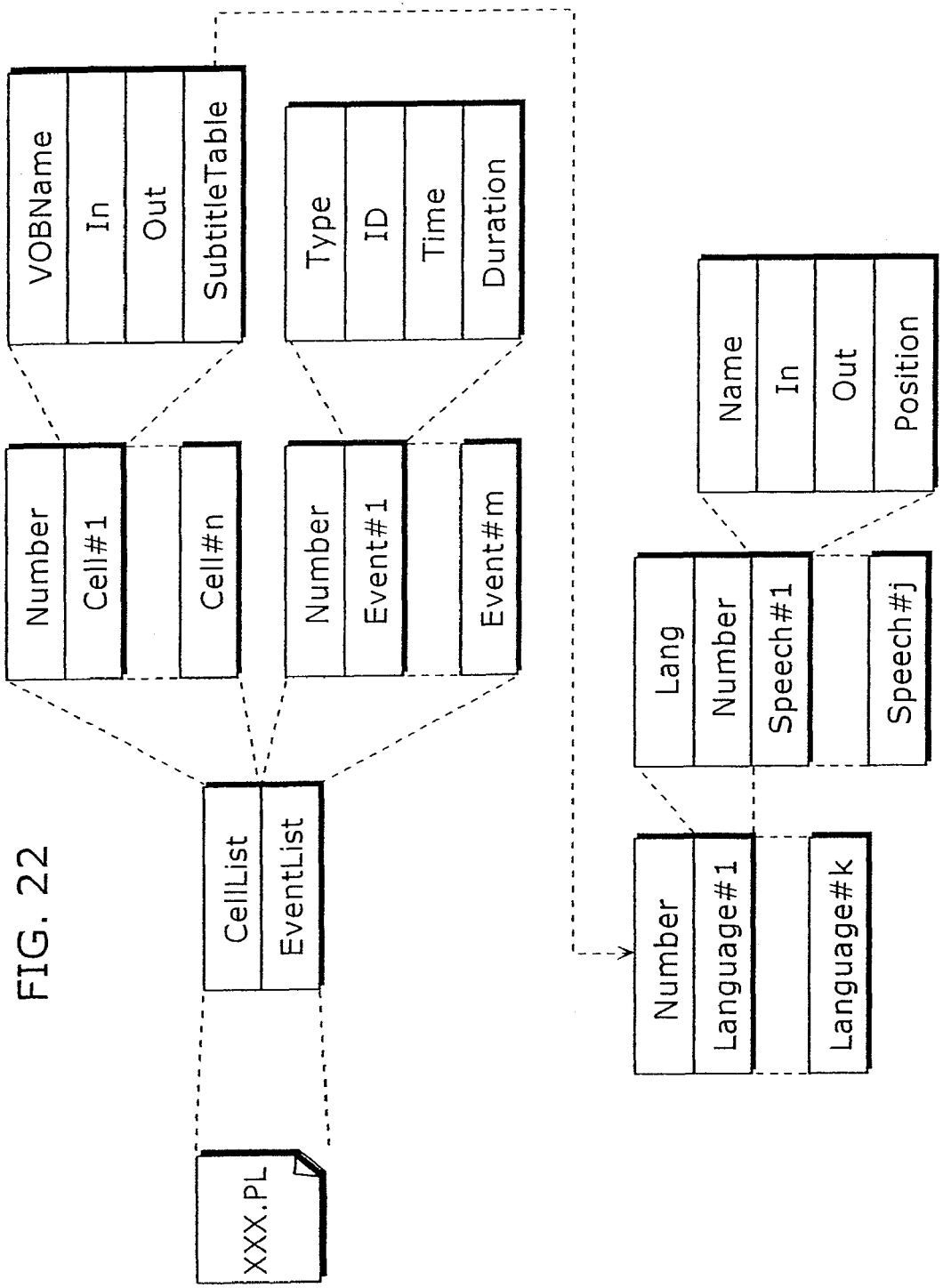
FIG. 22 is a diagram showing a play list file.

Next, with reference to FIG. 22, it is explained about an internal structure of play list information ("XXX. PL").

The play list information is made up of a cell list (CellList) and an event list (EventList).

The cell list (CellList) is a playback sequence in a play list, and the cell is played back in an order of description on the list. The contents of the cell list (CellList) include the number of cells (Number) and each pieces of cell information (Cell#1 to Cell#n).

The cell information (Cell#) includes a VOB file name (VOBName), a start time (In) and end time (Out) in the VOB, and a subtitle table. The start time (In) and end time (Out) are described by frame numbers in each VOB, and an address of the VOB data necessary for playback can be obtained by using the time map (TMAP).

The subtitle table is a table having subtitle information to be played back at the same time with the VOB. The subtitle can have a plurality of languages similar to audio, and first information of the subtitle table is made up of a number of languages (Number) and the following table for each language (Language#1 to Language#k).

Each language table (Language#) is made up of language information (Lang), the number of subtitle information (Number) which is separately displayed, and subtitle information of the subtitle (Speech#1 to Speech#j). The subtitle information (Speech#) is made up of a corresponding image data file name (Name), a subtitle display start time (In), subtitle display end time (Out), and a display position of the subtitle (Position).

The event list (EventList) is a table in which events generated in the play list are defined. The event list is made up of each event (Event#1 to Event#m) following to the number of events (Number). Each event (Event#) is made up of a type of event (Type), an event ID (ID), an event generation time (Time) and a duration.

Figure 23:
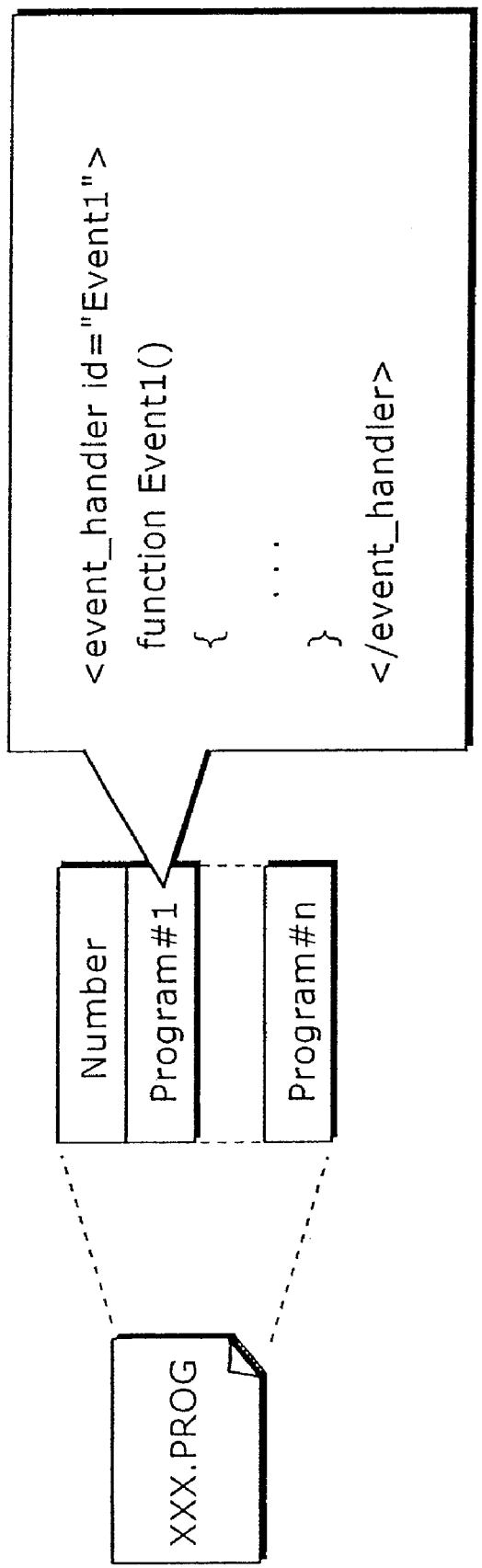
FIG. 23 is a diagram showing a structure of a program file corresponding to the play list.

FIG. 23 is an event handler table ("XXX. PROG") having an event handler (time event and user event for menu selection) for each play list.

The event hander table has a defined event handler/the number of programs (Number) and individual event handler/program (Program#1 to Program#n). The description in each event handler/program (Program#) has a definition about event handler start (<event_handler>tag) an ID of an event handler paired with the event. After that, the program is described between curly brackets "{" and "}" following to a Function. The events (Event#1 to Event#m) stored in an event list of the "XXX. PL" is specified using an ID of an event handler.

Figure 24:
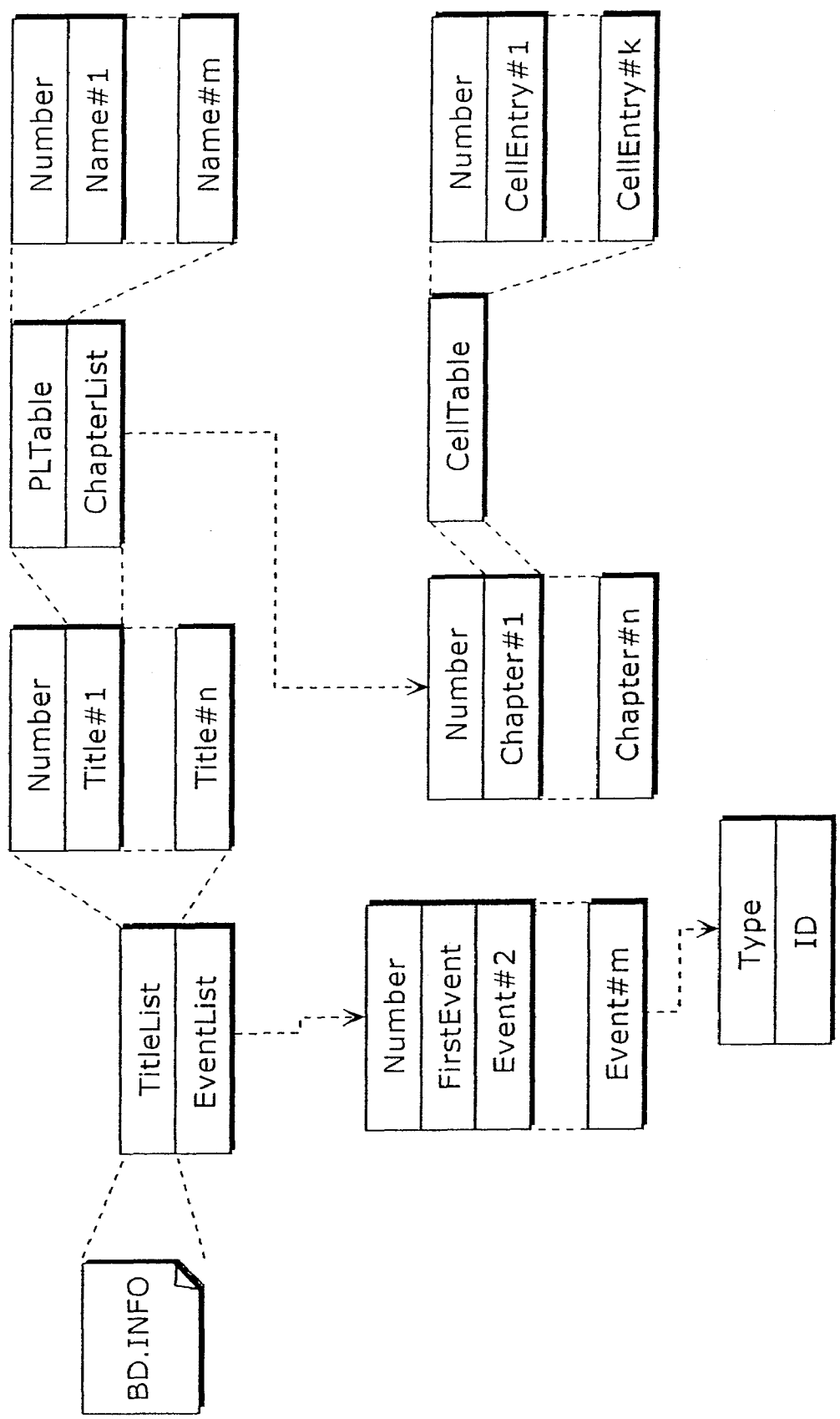
FIG. 24 is a diagram showing a structure of a BD disc total database information file.

Next, with reference to FIG. 24, it is explained about an internal structure of information concerning a BD disc as a whole ("BD. INFO").

The BD disc total information is made up of a title list and an event table for a global event.

The title list is made up of a number of titles in a disc (Number) and the following each title information (Title#1 to Title#n). Each title information (Title#) includes a play list table (PLTable) included in a title and a chapter list in the title. The play list table (PLTable) includes the number of play lists in the title (Number) and a play list name (Name), specifically, a file name of the play list.

The chapter list is made up of a number of chapters (Number) included in the title and individual chapter information (Chapter#1 to Chapter#n). Each pieces of the chapter information (Chapter#) has a table of cells included in the chapter. The cell table is made up of a number of cells (Number) and individual cell entry information (CellEntry#1 to CellEntry#k). The cell entry information (CellEntry#) is described with a play list name including the cell and a cell number in the play list.

The event list (EventList) has a number of global events (Number) and individual global event information. Here, it should be mentioned that a global event defined first is called a first event, which is an event to be called first when a BD disc is inserted to a player. The event information for global event only has an event type (Type) and event ID (ID).

Figure 25:
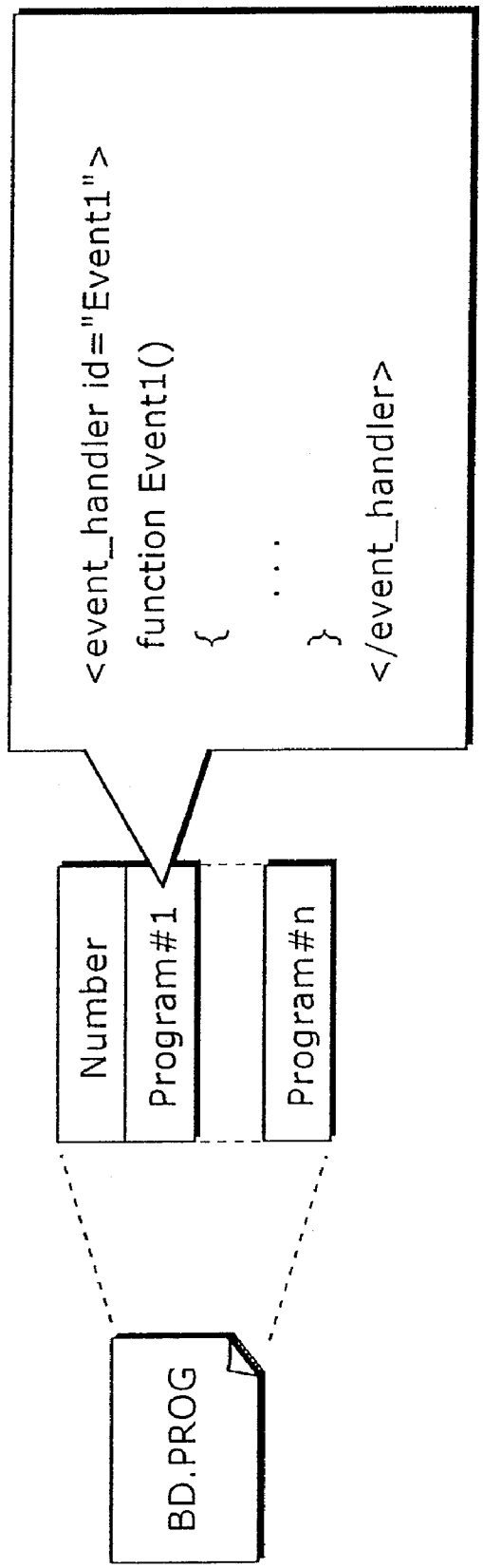
FIG. 25 is a diagram showing a structure of a file for recording global event handler.

FIG. 25 shows a table of a program of a global event handler ("BD. PROG"). This table is same as the event handler table explained in FIG. 23.

In such BD-ROM format, in the case of storing the AVC stream st outputted from picture coding unit 10, the VOBU is made up of one or more random access units RAU.

It should be noted that in a stream of the MPEG-4 AVC which is multiplexed into the BD-ROM, the flag information indicating that a PPS necessary for decoding a trick-play AU can be obtained by decoding only the trick-play AU is guaranteed or the flag information indicating that all PPS in the random access unit RAU are stored in the head AU of the random access unit RAU may be stored in the BD database information.

It should be noted that the access information such as an EP map may be stored in a table as binary data or it may be in a text format such as an Extensible Markup Language (XML).

Fifth Embodiment

Figure 26:
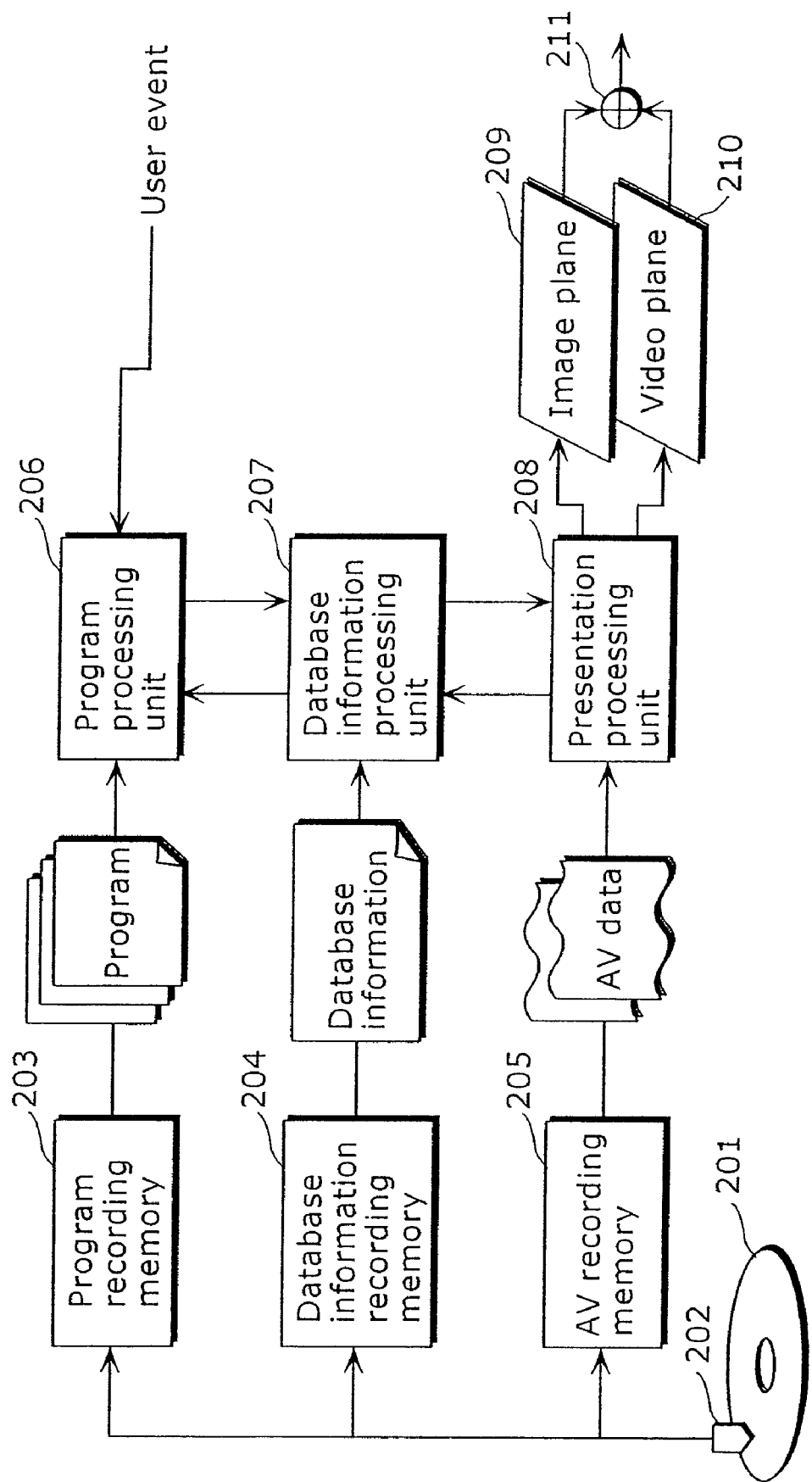
FIG. 26 is a schematic block diagram showing a HD-DVD player.

FIG. 26 is a block diagram roughly showing a functional structure of a player which plays back data recorded on the BD disc according to the fourth embodiment.

The data recorded on a BD disc 201 are read out through optical pickup 202. The read data is transferred to a special memory depending on respective type of data. The BD playback program (contents of "BD. PROG" or "XXX. PROG" files), the BD database information ("BD. INFO", "XXX. PL" or "YYY. VOBI"), and the AV data ("YYY. VOB" or "ZZZ. PNG") are respectively transferred to a program recording memory 203, a database information recording memory 204 and an AV recording memory 205.

The BD playback program recorded in the program recording memory 203, the BD database information recorded in the database information recording memory 204, and the AV data recorded in the AV recording memory 205 are respectively processed by a program processing unit 206, a database information processing unit 207, and a presentation processing unit 208.

The program processing unit 206 processes a program for receiving information about play lists to be played back by the database information processing unit 207 and event information such as timing of executing a program. Also, the program can dynamically change the play lists to be played back. In this case, it can be realized by sending an instruction of playing back play list to the database information processing unit 207. The program processing unit 206 receives an event from a user, specifically, a request sent from a remote controller key, and executes the event if there is a program corresponding to the user event.

The database information processing unit 207 receives an instruction of the program processing unit 206, analyzes the corresponding play list and database information of a VOB corresponding to the play list, and instructs to play back target AV data to the presentation processing unit 208. Further, the database information processing unit 207 receives standard time information from the presentation processing unit 208, instructs the presentation processing unit 208 to stop the AV data playback based on the time information, and further generates an event indicating a program executing timing for the program processing unit 206.

The presentation processing unit 208 has decoders respectively corresponding to video, audio, and subtitle/image (still picture). Each of the decoders decodes AV data based on an instruction sent from the database information processing unit 207, and outputs the decoded AV data. The video data, subtitle and image are respectively described on a special plane, a video plane 210 and an image plane 209 after they are decoded, and synthesized the images by the synthesizing unit 211 and outputted to a display device such as a television.

At the time of trick-play such as variable-speed playback and reverse playback, the presentation processing unit 208 interprets the variable-speed playback or reverse playback operations requested by a user, and notifies the database information processing unit 207 of information indicating a method of playback. The database information processing unit 207 notifies the playback method of the presentation processing unit 208. The presentation processing unit 208 detects trick-play AUs based on the information for specifying the trick-play AUs stored in the VOBU, and determines AUs to be decoded and displayed so as to satisfy the trick-play operations specified by the user. For example, when only AUs of I pictures and P pictures are decoded and displayed, the presentation processing unit 208 detects AUs of I pictures and P pictures based on the Access Unit Delimiter, slice header, and identification information included in a header of a NAL unit and the like. Hereafter, an example of a method of determining trick-play AUs is explained.

First, it is explained about a method of determining trick-play AU by referring to an Access Unit Delimiter is explained. The Access Unit Delimiter can show a type (primary_pic_type field) of slice data which constitutes an AU. Accordingly, for respective AU of I picture, P picture or B picture, an AU to be decoded at the time of trick-play can be determined by specifying respective types of the AUs.

Next, in the slice header, a type of slice data (slice_type field) can be shown. Here, a value indicating that all slice data in the AU are same types can be set in the slice_type. For example, if the slice_type is 7 in arbitral one slice data which constitutes an AU, it is shown that said slice and other slices in the AU are all I slices. Similarly, the values are defined to indicate: if the slice_type is 5, it is shown that all slices in the AU are P slices; and if the slice_type is 6, it is shown that all slices in the AU are B slices. Supposing that only slices having any one of the slice_type of 5, 6 and 7 are used at the time of coding, the AU to be decoded at the time of trick-play is determined by analyzing the slice type of the first slice of the AU. It should be noted that even if the slice_type is other than 5, 6 and 7, the AU to be decoded at the time of trick-play can be determined by analyzing the slice_type of all slices in the AU.

Next, when a determination is made based on a header of a NAL unit, an AU to be decoded at the time of trick-play can be determined by setting different field values for I picture, P picture and B picture as a value of a nal_ref_idc field in the NAL unit such as slices.

Further, when the NAL unit indicating information for trick-play and a SEI message are included in the random access unit RAU, the AU to be decoded at the time of trick-play may be determined based on the information.

It should be noted that the database information processing unit 207 can determine the AU to be decoded and displayed when the information for specifying the trick-play AU is included in the database information.

Furthermore, a method of obtaining PPS may be switched based on flag information in the case where the flag information indicating that the PPS necessary for decoding the trick-play AU can be obtained by decoding only the trick-play AUs has been stored in the database information or in the VOBU. Herein, if the flag has been set, the PPS is obtained only from the trick-play AUs, while if the flag has not been set, the PPS stored in the AUs other than the trick-play AUs are also obtained.

Note that, in the above mentioned embodiments, the coding method is not only limited to the MPEG-4 AVC, and other methods can be applied unless they are coding methods applicable to similar processing.

Furthermore, the access information such as an EP map may be stored in a table as binary data or may be in a text format such as an Extensible Markup Language (XML).

Sixth Embodiment

In addition, by recording a program for realizing the moving picture coding method and the moving picture decoding method as shown in each of the above-mentioned embodiments, onto a recording medium such as a flexible disk, it becomes possible to perform the processing as shown in each of the above embodiments easily in an independent computer system.

Figure 27A:
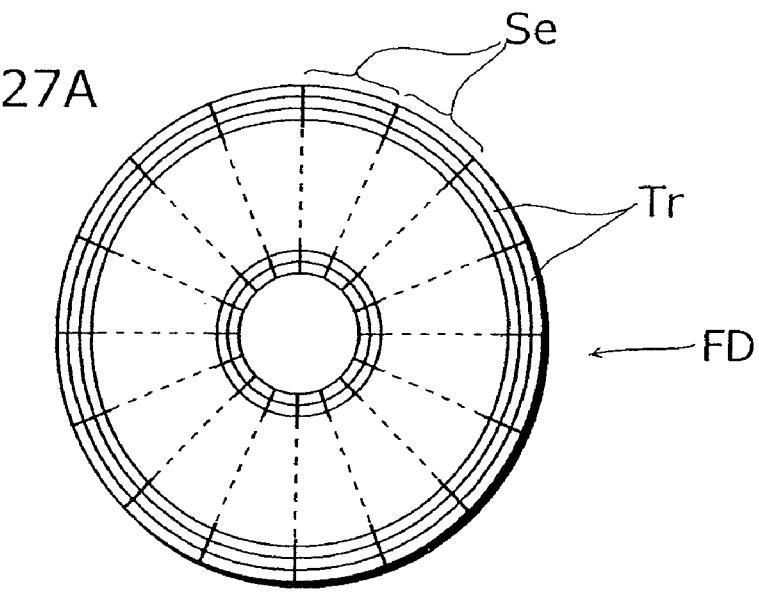
FIG. 27A, FIG. 27B and FIG. 27C respectively show recording media in which a program for realizing a picture coding method and a picture decoding method of the present invention.
Figure 27B:
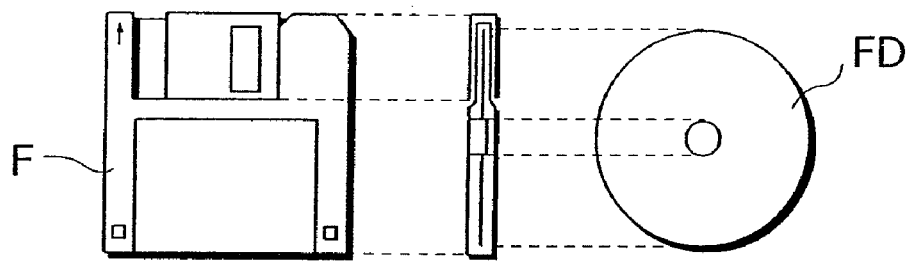
Figure 27C:
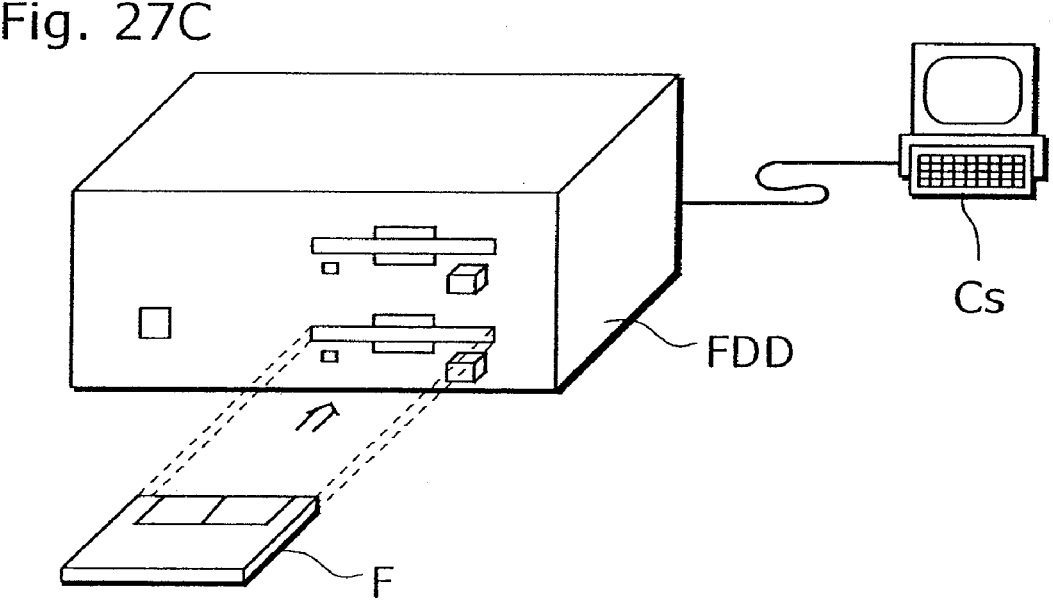

FIGS. 27A, 27B and 27C are explanatory diagrams showing a case where the moving picture coding method and the moving picture decoding method in the above embodiments are implemented in a computer system using a program recorded in the recording medium such as a flexible disc.

FIG. 27B shows the front view of a flexible disk and the schematic cross-section, as well as a flexible disk itself, whereas FIG. 27A shows an example of a physical format of the flexible disk as a recording medium itself. A flexible disk FD is contained in a case F, a plurality of tracks Tr are formed concentrically on the surface of the disk in the radius direction from the periphery, and each track is separated into 16 sectors Se in the angular direction. Therefore, in the flexible disk storing the above-mentioned program, the above program is recorded in an area allocated for it on the above flexible disk FD. In addition, FIG. 27C shows a structure for recording and playing back the program on and from the flexible disk FD. When the program is recorded on the flexible disk FD, the computer system Cs writes in the moving picture coding method and the moving picture decoding method as the program on the flexible disk FD via a flexible disk drive. When the above moving picture coding method and the moving picture decoding method are constructed in the computer system using the program recorded on the flexible disk, the program is read out from the flexible disk via the flexible disk drive and transferred to the computer system.

Note that the above explanation is made on an assumption that a recording medium is a flexible disk, but the same processing can also be performed using an optical disk. In addition, the recording medium is not limited to these, but any other mediums such as an IC card and a ROM cassette can be used in the same manner if a program can be recorded on them.

In the above, the picture coding apparatus, picture decoding apparatus, multiplexing apparatus, a BD disc player and the like according to the present invention are described based on the embodiments. However, this invention is not limited to the disclosure of the embodiments. The present invention includes variations came up by those in the art applied in the present embodiments in a range of the arguments of the present invention.

For example, no to mention that the present invention includes an optical recording apparatus, video transmitting apparatus, digital television broadcasting transmitting apparatus, web server, communication apparatus, cell phone information terminal and the like that include one of the picture coding apparatus and the multiplexing apparatus in the present embodiments, and a video receiving apparatus, digital television broadcasting receiving apparatus, communication apparatus, cell phone information terminal and the like that has the picture decoding apparatus of the present embodiments.

It should be noted that each of functional blocks in block diagrams (such as FIG. 8 and FIG. 15) is typically realized as a Large Scale Integration (LSI) that is an integrated circuit. The functional blocks may be individually separated into one chip or may be integrated into one chip so as to include a part or all of the blocks. (e.g. functional blocks other than a memory may be integrated into one chip.)

Whereas LSI is used in here, it is called as an Integrated Circuit (IC), a system LSI, a super LSI, or an ultra SLI according to a degree of integration.

Further, while the method of integrating circuits is not only limited to the LSI, it may be realized by a special circuit or by a general processor. After constructing the LSI, the followings may be used: a Field Programmable Gate Array (FPGA) capable of programming; and a reconfigurable processor capable of reconfiguring a connection and setting of circuit cells in the LSI.

Furthermore, if a technology of integrating circuits is introduced as a replace of the LSI by a new technology or a development of semiconductor technology, there is no doubt that the functional blocks can be integrated using the newly introduced technology. There is a possibility of an application of a biotechnology.

In addition, a unit in which data to be coded or decoded is stored among functional blocks may be separated as another structure without being integrated into one chip.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The picture coding method according to the present invention has an effect that a picture parameter set necessary for decoding is appropriately obtained and a picture can be decoded even at the time of trick-play such as high-speed playback. It is applicable to appliances in general having a trick-play function such as variable-speed playback and reverse playback using a stream of MPEG-4 AVC. Also, it is particularly effective for optical disc related appliances which focus on the trick-play function.

The invention claimed is:

1. A picture coding apparatus which (i) codes pictures, on a picture-by-picture basis, each picture including at least a pixel data storage unit for storing pixel data and a supplemental information storage unit, for storing supplemental information, being located ahead of the pixel data storage unit, and (ii) generates a random access unit, as a part of a stream, including the coded pictures, the picture coding apparatus comprising:
  a coding unit configured to generate a piece of coded pixel data by coding a piece of pixel data of each of the pictures;
  a first information generation unit configured to generate sequence parameter set information which is a parameter group to be commonly referenced for decoding pieces of coded pixel data included in the random access unit, and to code the generated sequence parameter set information;
  a second information generation unit configured to generate, for each piece of coded pixel data, a piece of picture parameter set information which is a parameter group to be referenced for decoding each piece of the coded pixel data, and to code the generated piece of picture parameter set information;
  a first storage unit configured to store the piece of the coded pixel data in each of the pixel data storage units;
  a second storage unit configured to store the coded sequence parameter set information in a supplemental information storage unit of a coded picture which is located at a head of the random access unit; and
  a third storage unit configured to store a predetermined number of coded pieces of picture parameter set information in the supplemental information storage unit of the coded picture which is located at a head of the random access unit,
  wherein the third storage unit is configured to store the coded piece of picture parameter set information in a supplemental information storage unit of a coded picture which refers to the coded piece of picture parameter set information, the coded piece of picture parameter set information being different from the predetermined number of the coded pieces of picture parameter set information stored by the third storage unit.

2. A picture coding method for (i) coding pictures, on a picture-by-picture basis, each picture including at least a pixel data storage unit for storing pixel data and a supplemental information storage unit, for storing supplemental information, being located ahead of the pixel data storage unit, and (ii) generating a random access unit, as a part of a stream, including the coded pictures, the picture coding method comprising:
  generating a piece of coded pixel data by coding a piece of pixel data of each of the pictures;
  generating sequence parameter set information which is a parameter group to be commonly referenced for decoding pieces of coded pixel data included in the random access unit, and coding the generated sequence parameter set information;
  generating, for each piece of coded pixel data, a piece of picture parameter set information which is a parameter group to be referenced for decoding each piece of the coded pixel data, and coding the generated piece of picture parameter set information;
  storing the piece of the coded pixel data in each of the pixel data storage units;
  storing the coded sequence parameter set information in a supplemental information storage unit of a coded picture which is located at a head of the random access unit; and
  storing a predetermined number of coded pieces of picture parameter set information in the supplemental information storage unit of the coded picture which is located at a head of the random access unit,
  wherein the storing the coded pieces of picture parameter set information includes storing the coded piece of picture parameter information in a supplemental information storage unit of a coded picture which refers to the coded piece of picture parameter set information, the coded piece of picture parameter set information being different from the redetermined number of the coded pieces of picture parameter set information stored.

3. A picture decoding apparatus which decodes coded pictures out of the stream generated by the picture coding apparatus according to claim 1, the picture decoding apparatus comprising:
  a picture specification unit configured to specify a picture to be decoded out of the coded pictures;
  a first obtainment unit configured to obtain, from a supplemental information storage unit of a coded picture located at a head of the random access unit, coded sequence parameter set information which is a parameter group to be commonly referenced for decoding pieces of coded pixel data included in the random access unit;
  a second obtainment unit configured to obtain a coded piece of picture parameter set information, which is a parameter group to be referenced for decoding each piece of the coded pixel data to be decoded, the coded piece of picture parameter set information being obtained from either (i) the supplemental information storage unit of the coded picture located at a head of the random access unit, or (ii) a supplemental information storage unit of the coded picture to be decoded;
  a first decoding unit configured to decode the coded sequence parameter set information;
  a second decoding unit configured to decode the coded piece of picture parameter set information; and
  a third decoding unit configured to decode the piece of the coded pixel data to be decoded by referencing the decoded sequence parameter set information and the decoded piece of picture parameter set information.

4. A picture decoding method for decoding coded pictures out of the stream generated by the picture coding method according to claim 2, the picture decoding method comprising:
- specifying a picture to be decoded out of the coded pictures;
- obtaining, from a supplemental information storage unit of a coded picture located at a head of the random access unit, coded sequence parameter set information which is a parameter group to be commonly referenced for decoding pieces of coded pixel data included in the random access unit;
- obtaining a coded piece of picture parameter set information which is a parameter group to be referenced for decoding the coded pixel data to be decoded, the coded piece of picture parameter set information being obtained from either (i) the supplemental information storage unit of the coded picture located at a head of the random access unit, or (ii) a supplemental information storage unit of the coded picture to be decoded;
- decoding the coded pieces of sequence parameter set information;
- decoding the coded pieces of picture parameter set information; and
- decoding the piece of the coded pixel data to be decoded by referencing the decoded sequence parameter set information and the decoded piece of picture parameter set information.

5. A recording method for (i) coding pictures, on a picture-by-picture basis, each picture including at least a pixel data storage unit for storing pixel data and a supplemental information storage unit, for storing supplemental information, being located ahead of the pixel data storage unit, and (ii) recording a stream having in a part a random access unit including coded pictures in a computer-readable recording medium, the recording method comprising:
- generating a piece of coded pixel data by coding a piece of pixel data of each of the pictures;
- generating sequence parameter set information which is a parameter group to be commonly referenced for decoding the piece of coded pixel data included in the random access unit, and coding the generated sequence parameter set information;
- generating, for each piece of coded pixel data, a piece of picture parameter set information which is a parameter group to be referenced for decoding each piece of the coded pixel data, and coding the generated piece of picture parameter set information;
- storing the piece of the coded pixel data in each of the pixel data storage units;
- storing the coded sequence parameter set information in a supplemental information storage unit of a coded picture which is located at a head of the random access unit; and
- storing a predetermined number of coded pieces of picture parameter set information in the supplemental information storage unit of the coded picture which is located at a head of the random access unit,
- wherein the storing of the coded pieces of picture parameter set information includes storing the coded piece of picture parameter information in the supplemental information storage unit of a coded picture which refers to the coded piece of picture parameter set information, the coded piece of picture parameter set information being different from the redetermined number of the coded pieces of picture parameter set information stored.

6. A recording medium which has a area in which a stream is recorded, the stream including a random access unit included coded pictures each having a pixel data storage unit for storing pixel data and a supplemental information storage unit, for storing supplemental information, being located ahead of the pixel data storage unit,
- wherein a coded sequence parameter set information is stored in a supplemental information storage unit of a coded picture which is located at a head of the random access unit, the sequence parameter set information is a parameter group to be commonly referenced for decoding pieces of coded pixel data included in the random access unit,
- a predetermined number of coded pieces of picture parameter set information is stored in the supplemental information storage unit of the coded picture which is located at a head of the random access unit, each piece of picture parameter set information is a parameter group to be referenced for decoding each piece of the coded pixel data,
- a coded piece of picture parameter set information, which is different from the predetermined number of the coded pieces of picture parameter set information stored in the coded picture located at a head of the random access unit, is stored in the supplemental information storage unit of a coded picture which refers to the coded piece of picture parameter set information.

* * * * *